(12) United States Patent
Ito

(10) Patent No.: US 7,865,672 B2
(45) Date of Patent: Jan. 4, 2011

(54) ELECTRONIC SYSTEM WITH FIRST AND SECOND ELECTRONIC UNITS ELECTRICALLY COMMUNICABLE WITH EACH OTHER

(75) Inventor: Akira Ito, Aichi-ken (JP)

(73) Assignee: Denso Corporation, Kariya (JP)

( * ) Notice: Subject to any disclaimer, the term of this patent is extended or adjusted under 35 U.S.C. 154(b) by 889 days.

(21) Appl. No.: 10/863,777

(22) Filed: Jun. 9, 2004

(65) Prior Publication Data

US 2004/0254766 A1    Dec. 16, 2004

(30) Foreign Application Priority Data

Jun. 10, 2003   (JP)   .............................. 2003-165546
Mar. 12, 2004   (JP)   .............................. 2004-071319

(51) Int. Cl.
*G06F 13/00*   (2006.01)

(52) U.S. Cl. ........................... 711/154; 711/165; 711/5; 711/103; 713/1

(58) Field of Classification Search ................. 711/154, 711/103, 5, 165; 713/1
See application file for complete search history.

(56) References Cited

U.S. PATENT DOCUMENTS

| | | | | |
|---|---|---|---|---|
| 4,882,702 A | * | 11/1989 | Struger et al. ................... | 710/2 |
| 5,189,617 A | * | 2/1993 | Shiraishi ....................... | 701/48 |
| 5,394,327 A | | 2/1995 | Simon, Jr. et al. | |
| 5,574,849 A | * | 11/1996 | Sonnier et al. ................. | 714/12 |
| 6,003,396 A | * | 12/1999 | Bellinger et al. ........... | 74/336 R |
| 6,243,630 B1 | * | 6/2001 | Oohara et al. .................. | 701/35 |
| 6,334,080 B1 | * | 12/2001 | Iwai et al. ...................... | 701/48 |
| 6,374,161 B1 | * | 4/2002 | Iwai et al. ...................... | 701/1 |
| 6,907,503 B2 | * | 6/2005 | Lindsay et al. .............. | 711/149 |
| 7,289,895 B2 | | 10/2007 | Ishimoto et al. | |

FOREIGN PATENT DOCUMENTS

| | | |
|---|---|---|
| DE | 4315494 | 9/1994 |
| DE | 10239056 | 4/2003 |
| JP | 60-160295 | 8/1985 |
| JP | 5-155295 | 6/1993 |
| JP | 06-169480 | 6/1994 |
| JP | 07-093006 | 4/1995 |
| JP | 10-27137 | 1/1998 |
| JP | 2003-213730 | 7/2003 |
| WO | WO 0179947 | 10/2001 |

OTHER PUBLICATIONS

Barr, Michael. "Introduction to Watchdog Timers" Oct. 1, 2001. retrieved from http://www.embedded.com/showArticle.jhtml?articleID=9900324 on Sep. 28, 2006.*

(Continued)

*Primary Examiner*—Hong Kim
(74) *Attorney, Agent, or Firm*—Nixon & Vanderhye P.C.

(57) ABSTRACT

An electronic system has a first electronic unit for carrying out a first predetermined operation and a second electronic unit for carrying out a second predetermined operation. The first and second electronic units are electrically communicable with each other. In the system, the first electronic unit stores control data. The second control unit requires the control data for carrying out the second predetermined operation. The second electronic unit sends to the first electronic unit a request to send the control data when the second electronic unit is reset.

36 Claims, 11 Drawing Sheets

OTHER PUBLICATIONS

"IEEE 100, The Authoritative Dictionary of IEEE Standard Terms" 7th Edition. IEEE, 2000. pp. 743.*

Notification of Reasons for Rejection issued in corresponding JP Application No. 2004-071319 on Jan. 30, 2008 with English-language translation.

European Search Report issued in European Application No. 04013664.0 dated Aug. 14, 2007.

Office Action issued Sep. 1, 2009 in corresponding Japanese Application No. 2004-071319 with an at least partial English-language translation thereof.

* cited by examiner

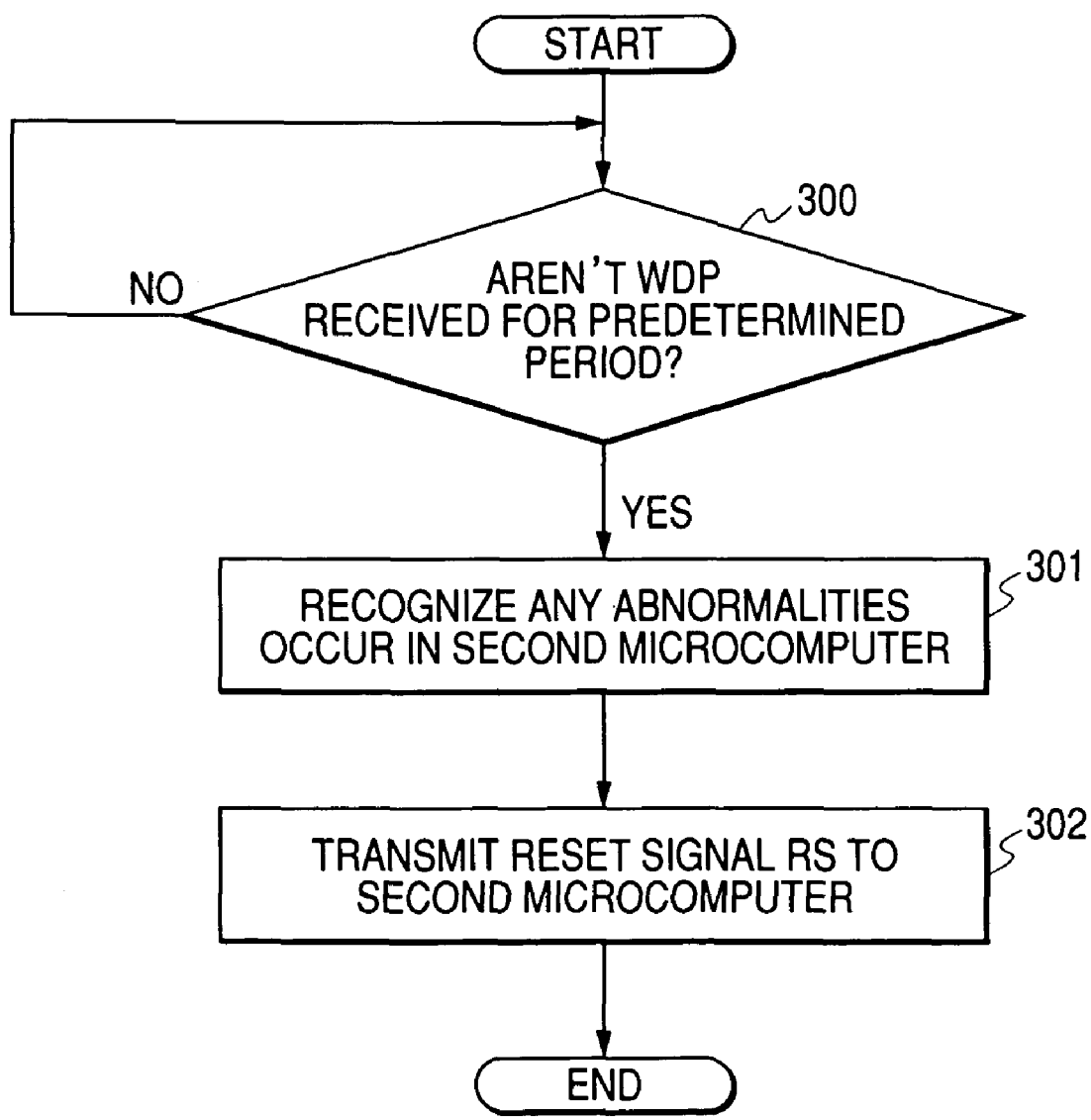

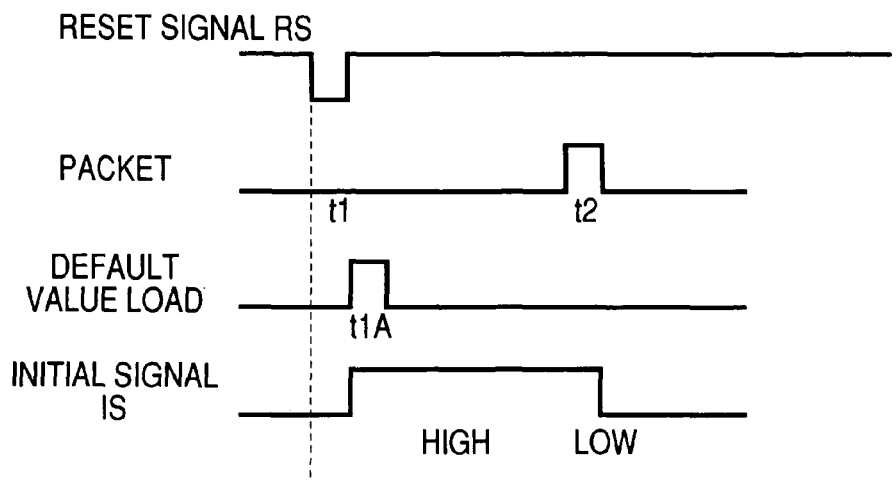
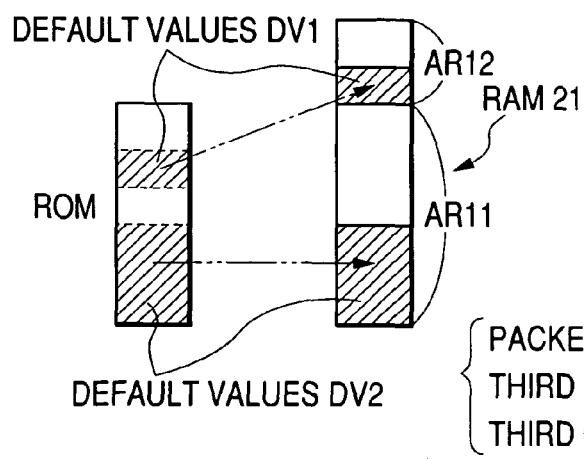
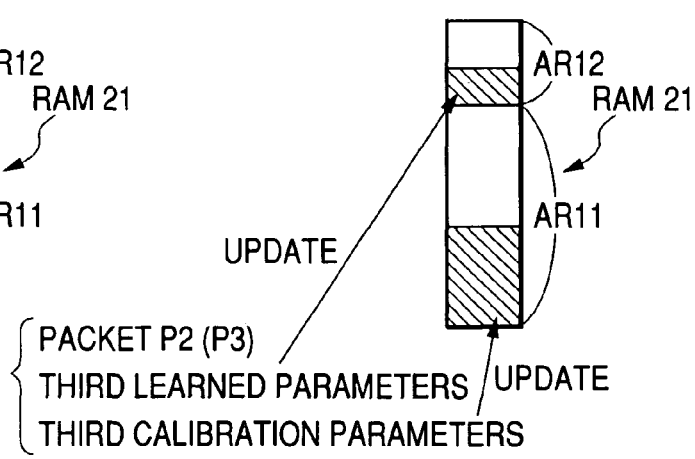

ELECTRONIC SYSTEM WITH FIRST AND SECOND ELECTRONIC UNITS ELECTRICALLY COMMUNICABLE WITH EACH OTHER

BACKGROUND OF THE INVENTION

The present invention relates to an electronic system with the function of backing up data from one or more electronic units installed therein.

An example of conventional methods for backing up information from each electronic unit installed in a system is disclosed in Japanese Unexamined Patent Publication No. H05-155295.

This disclosed method uses a backup RAM provided in a specified ECU (Electrical Control apparatus) in ECUs installed in a system.

This backup RAM is constantly connected to an internal power supply in the system. The backup RAM can thus hold memory contents even after the system power supply is turned off.

In the operation of the system, the specified ECU collects data stored in each ECU at predetermined intervals and then stores the collected data in the backup RAM as backup information.

After the power supply in the electronic system is turned off, and turned on again, the specified ECU reads out the backup information stored in the backup RAM and sends it to each ECU installed in the system.

The disclosed method sends the information stored in each ECU to the specified ECU, and the specified ECU centrally backs up the sent information in the backup RAM. The specified ECU is configured to send the information to each ECU when the system starts up.

If the specified ECU needs to individually send the backup information to at least one of the ECUs when the system is running, such as in a case where at least one of the ECUs is reset, the whole system would need be reset to resend the backup information to every ECU.

When the whole system is not restarted, at least one of the ECUs, which is reset, controls a target device with the default values (previously set values required for the control of the target device).

At least one of the reset ECUs need continue to perform the control process until it learns the values required for the control of the corresponding target while controlling the target device with the default values.

These problems may occur in a system that has a plurality of microcomputers and requires to back up data, which is stored in each of the microcomputers, in a specified microcomputer in the microcomputers.

SUMMARY OF THE INVENTION

The present invention is made on the background for providing an electronic system that is capable of sending control data that at least one electronic unit requires for controlling a target during the electronic system being operated.

According to one aspect of the present invention, there is provided an electronic system, which has a first electronic unit for carrying out a first predetermined operation and a second electronic unit for carrying out a second predetermined operation. The first and second electronic units are electrically communicable with each other. In the system, control data storing means is provided in the first electronic unit. The data storage means stores control data. The second control unit requires the control data for carrying out the second predetermined operation. Request sending means is provided in the second electronic unit for sending to the first electronic unit a request to send the control data when the second electronic unit is reset.

In the aspect of the present invention, even if the second electronic unit is reset, the first electronic unit can transmit the control data, in response to the request, which is required for the second predetermined operation without resetting the whole system. As a result, even if the second electronic control unit is reset, the second electronic unit can obtain the control data required for the second predetermined operation.

According to another aspect of the present invention, there is provided an electronic system, which has a first electronic unit for carrying out a first predetermined operation and a second electronic unit for carrying out a second predetermined operation. The first and second electronic units are electrically communicable with each other. In the system, control data storing means is provided in the first electronic unit for storing therein control data. The second control unit minimally requires pieces of the control data for carrying out the second predetermined operation. Request sending means is provided in the second electronic unit for sending to the first electronic unit a request to send the pieces of the control data when the second electronic unit is reset.

BRIEF DESCRIPTION OF THE DRAWINGS

Other objects and aspects of the invention will become apparent from the following description of embodiments with reference to the accompanying drawings in which:

FIG. 4 is a flowchart showing processes of the first microcomputer for detecting that any abnormalities occur in the second microcomputer according to the first embodiment;

FIG. 5 is a schematic timing chart of a reset signal, the packet, and an initial signal according to the first embodiment;

FIG. 6A is a schematic diagram illustrating the structure of storage areas of a ROM and a RAM of the second microcomputer;

FIG. 6B is a schematic diagram of storage areas of the RAM of the second microcomputer;

DETAILED DESCRIPTION OF PREFERRED EMBODIMENTS

First Embodiment

Figure 1:
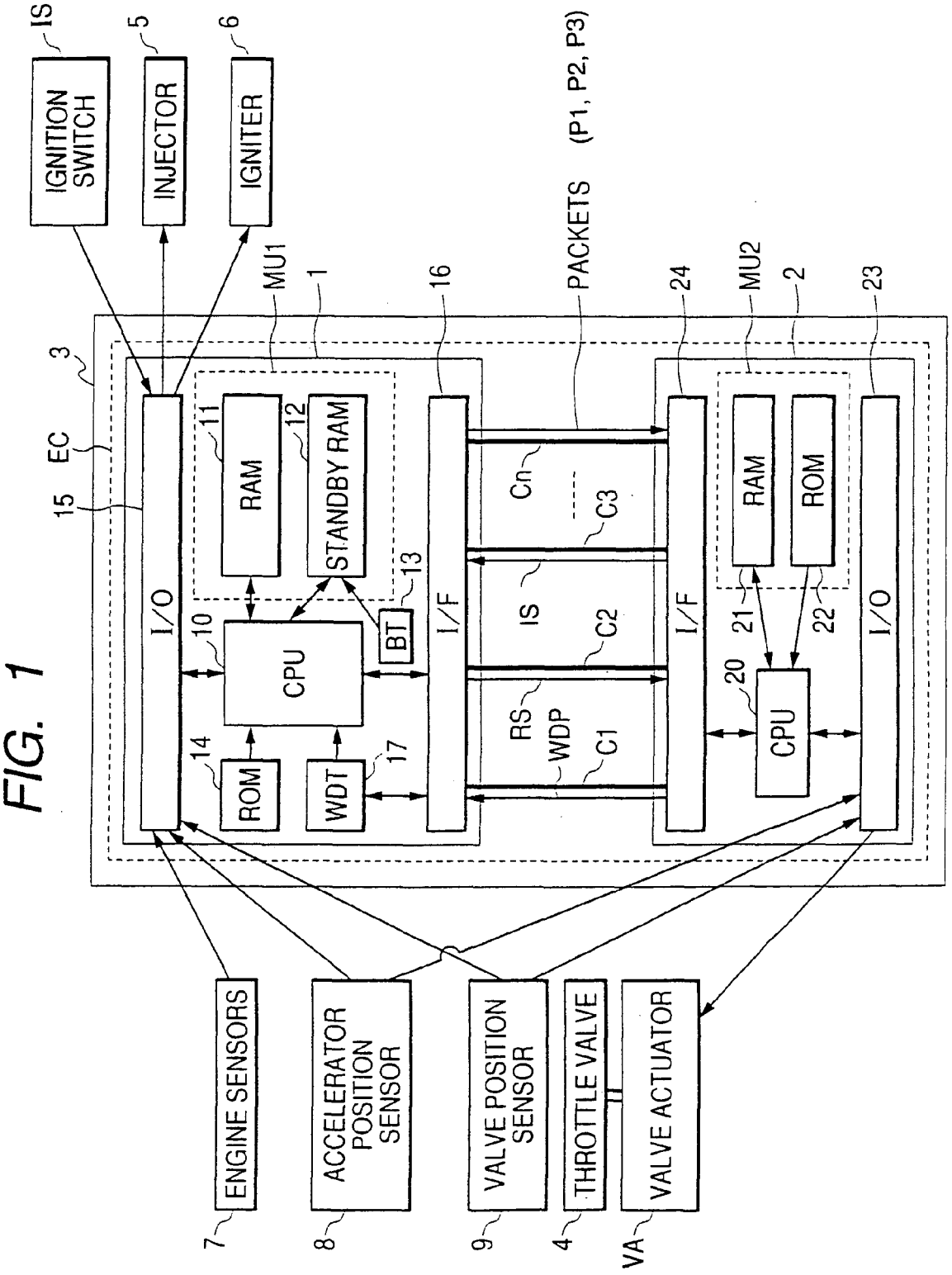
FIG. 1 is a block diagram illustrating the whole configuration of an electronic system according to a first embodiment of the present invention.

FIG. 1 shows a block diagram of the whole configuration of an electronic system EC according to a first embodiment of the present invention.

The electronic system EC according to this first embodiment is installed in an electronic control unit 3, and the electronic control unit 3 is installed in a vehicle with an internal combustion engine. The electronic system EC is operative to control the internal combustion engine.

That is, the electronic system EC has a first microcomputer 1 for controlling the internal combustion engine, and a second microcomputer 2 for controlling at least one throttle of the engine system. The first microcomputer 1 and the second microcomputer 2 are electrically coupled with each other through communication lines. The internal combustion engine is referred to simply as "engine" hereinafter.

The first microcomputer 1, which is served as a main electronic unit, is electrically connected to at least one injector 5 of the engine and at least one igniter 6 thereof.

The injector 5 is configured inject fuel to the combustion chamber of the engine under the control of the first microcomputer 1.

The igniter 6 is electrically connected to an ignition coil and a battery installed in the vehicle, respectively. The ignition coil is electrically connected to a spark plug, and the spark plug is screwed into the combustion chamber of the engine.

The igniter 6 receives a current supplied from the battery and controls to turn on and shut off the flow of the primary current in the primary winding of the ignition coil.

The second microcomputer 2 is electrically connected to a valve actuator VA mechanically connected to at least one throttle valve 4 of the engine. The throttle valve 4 is disposed in a throttle (throttle body) of an injection system installed in the engine. The valve actuator VA makes the throttle valve 4 rotate to control the volume of air in the air and fuel mixture under the control of the second microcomputer 2 in accordance with an accelerator pedal of the vehicle.

On the other hand, engine sensors 7 are disposed in the vehicle for periodically detecting engine condition signals that represent the conditions of the engine, which include signals indicating the revolutions of the engine, the temperature of the engine cooling water, the amount of oxygen in the exhaust from the engine, and so on.

The engine sensors 7 are electrically connected to the first microcomputer 1 so that they are configured to output periodically the detected engine condition signals to the first microcomputer 1, respectively.

An accelerator position sensor 8 is disposed in the vehicle and electrically connected to the first microcomputer 1 for periodically detecting the position of the accelerator pedal. The accelerator position sensor 8 is configured to output periodically the accelerator position signal representing the detected position of the accelerator pedal to the first microcomputer 1.

A valve position sensor 9 is disposed in the vicinity of the throttle valve 4, and electrically connected to the first microcomputer 1. The valve position sensor 9 is configured to periodically detect the valve position of the throttle valve 4 that determines the amount of air in the air and fuel mixture. The valve position sensor 9 is configured to periodically output the valve position signal, such as a voltage, representing the detected position of the throttle valve 4 to the first microcomputer 1.

The first microcomputer 1 is equipped with a CPU 10, and a memory unit MU1. The memory unit MU1 is composed of a RAM (Random Access Memory) 11, a standby RAM 12, and a battery (BT) 13. The RAM 11 and the standby RAM 12 are electrically coupled to the CPU 10.

The standby RAM 12 is constantly connected to the battery 13 so that power is constantly supplied from the battery 13 to the standby RAM 12. That is, even if a power supply of the electronic control unit 3 is turned off, the standby RAM 12 can continuously hold therein its storage contents. In other words, the standby RAM 12 can backup the storage contents even if the power supply of the electronic control unit 3 is turned off.

The first microcomputer 1 is also equipped with a ROM (Read Only Memory) 14 and an input/output (I/O) unit 15 for electrically connecting between the CPU 10 and each of the injector 5, the igniter 6, the sensors 7-9, and an ignition switch IS for turning on and off the engine.

The first microcomputer 1 is further provided with a communication interface (I/F) 16 for establishing communication links between the first microcomputer 1 and the second microcomputer 2, and a watch dog timer 17 electrically connected to the CPU 10 and to the second microcomputer 2 through the communication I/F 16.

The second microcomputer 2 is composed of a CPU 20, and a memory unit MU2. The memory unit MU2 has a RAM 21, a ROM 22 and an I/O unit 23 for electrically connecting between the CPU 20 and each of the valve actuator VA of the throttle valve 4 and the sensors 8-9.

The second microcomputer 1 is also composed of a communication I/F 24 electrically connected to the communication I/F of the first microcomputer 1 via the communication lines C1, C2, . . . , Cn for allowing the CPUs 10 and 20 to communicate with each other.

In the first microcomputer 1, the ROM 14 previously stores therein calibration data.

The calibration data represents data that determines the operation characteristics of the engine as the control target of the electronic control unit 3.

Specifically, in the first embodiment, the calibration data, such as map data or relational equation data, includes first calibration parameters that represent the injection characteristic of the engine and second calibration parameters that represent the ignition characteristic of the engine. The first calibration parameters are classified into a plurality of types according to the necessity or the importance of controlling the injection of injector 5. The second calibration parameters are classified into a plurality of types according to the necessity or the importance of controlling the ignition of igniter 6.

The calibration data also includes third calibration parameters that represent the characteristic between the throttle valve position of the throttle valve 4, which is actuated by the valve actuator VA under the control of the second microcomputer 2, and the engine speed (the revolutions of the engine).

The third calibration parameters are classified into a number of types according to the necessity or the importance of controlling the position of throttle valve 4.

For example, the types of third calibration parameters include a conversion value between the valve position signal (voltage) outputted from the throttle position sensor 9 and the valve position of the throttle valve 4. The types of third calibration parameters also include a gain value of the throttle valve 4 used by a feedback control of the engine, and an abnormality determining value for determining an abnormal output of the throttle position sensor 9.

The first, second and third calibration parameters are determined to depend on the type (specifications and rating) of the engine, respectively. In the first embodiment, the whole data size of the calibration data is set to n bytes.

While the electronic control unit 3 normally operates after the boot of the electronic control unit 3, the CPU 10 performs, as the control operations of the engine, injection control operations and ignition control operations hereinafter.

Figure 2A:
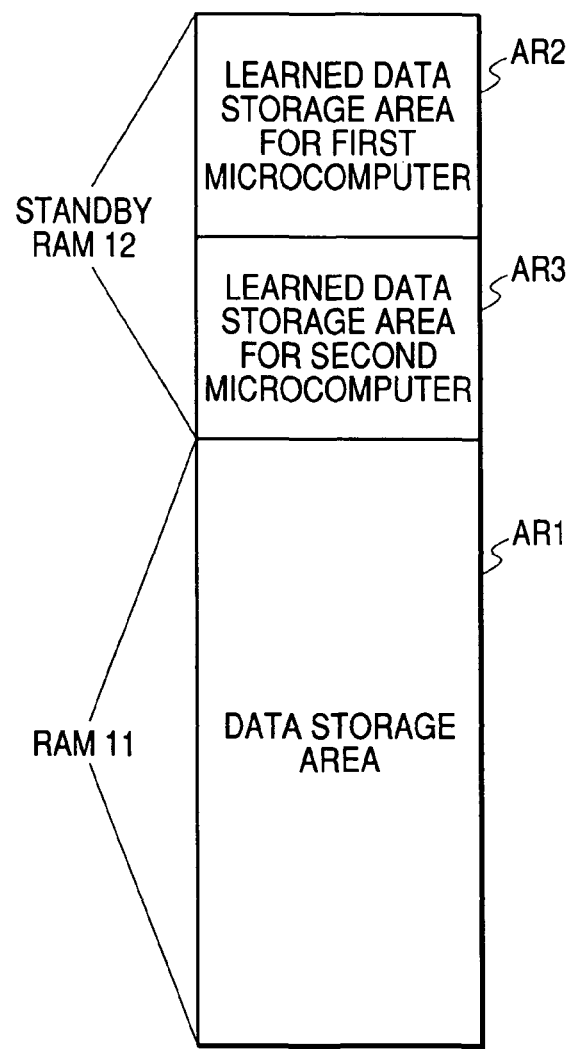
FIG. 2A is a schematic diagram illustrating the structure of storage areas of a memory unit of a first microcomputer illustrated in FIG. 1.

That is, the CPU 10 receives the outputted engine condition signals, the accelerator position signal, and the valve position signal from the sensors 7-9 and performs operations required for the control of the engine. The CPU 10 stores the result of the operations in the data storage area AR1 of the RAM 11 (see FIG. 2A).

Then, the CPU 10 carries out the feedback control of the engine based on the operation result.

The CPU 10 determines the fuel control signal that allows the injector 5 to inject the optimal amount of fuel according to the operation results, thereby outputting the fuel control signal to the injector 5. The injector 5 performs the fuel injection operation described above according to the fuel control signal.

Moreover, the CPU 10 determines, according to the operation result, the ignition control signal that optimally specifies the ignition advance angle, that is, the optimum ignition timing at which the primary current flow is shut off in the ignition coil, thereby outputting the ignition control signal to the igniter 6.

The igniter 6 shuts off the primary current flow in the ignition coil at an optimum timing corresponding to the ignition control signal, thereby producing a high voltage spark at the spark plug. The spark allows the air and fuel mixture in the combustion chamber to be ignited.

On the other hand, because of production variations among the configurations of the engine parts, such as the throttle and the engine chamber, changes of the engine parts due to the use of vehicle and aging thereof, the sensed values by the sensors 7-9 may deviate from the current conditions of the engine parts.

Then, the CPU 10 performs a learning process to determine (learn) data for compensating the deviations of the sensed values from the current conditions of the engine parts when the above engine control operations (injection control operation and the ignition control operation) are performed by the CPU 10. The data determined by the learning process of the CPU 10 for compensating the deviations of the sensed values from the current conditions of the engine parts is referred to as "learned data".

For example, the CPU 10 determines, as the learned data, first learned parameters for compensating the deviations of some of the sensed values that are required for the injection control operations of the CPU 10. Similarly, the CPU 10 determines, as the learned data, second learned parameters for compensating the deviations of some of the sensed values that are required for the ignition control operations of the engine.

The CPU 10 also determines, as the learned data, third learned parameters for compensating the deviations of some of the sensed values that are required for the control operations of the throttle valve position of the engine.

Specifically, the third learned parameters include the output voltage of the valve position sensor 9 when the throttle valve is located to the full-open position in the throttle, and the output voltage of the accelerator position sensor 8 when the accelerator pedal is located to the full-close position.

The learned data including the first, second and third learned parameters have the data size of, for example, N1 bytes and are stored in the learned data storage area AR2, which is previously allocated for the first microcomputer 1, of the standby RAM 12.

Each time the ignition switch IS is turned off and on, the first microcomputer 1 carries out the above learning process to update the learned data stored in the standby RAM 12 so that the learned data follows the current engine conditions.

The second microcomputer 2 may execute the above learning process to update the learned correction data that follows the current engine conditions.

Specifically, while the electronic control unit 3 normally operates after the boot of the electronic control unit 3 (that is, in the normal operation mode), the CPU 10 of the first microcomputer 1 is also operative to calculate a target position of the throttle valve 4 according to the received engine condition signals, the accelerator position signal, and the valve position signal.

The CPU 10 is operative to convert the calculated target position of the throttle valve 4 into target position data with, for example, 2-bytes to store it in the data storage area AR1 of the RAM 11. The CPU 10 is also operative to convert the accelerator position signal and the valve position signal into digitized position data whose data size of, for example, 24 bytes.

The CPU 10 is operative to read out the third calibration parameters required for the control of the throttle valve position, for example, 8-bytes by 8-bytes from the ROM 14. The CPU 10 combines each of the 8-byte third calibration parameters, the 24-byte position data, and the 2-byte target position data, thereby producing pieces of position control data each piece of which has the data size of, for example, 34 bytes. That data size of 34 bytes is previously determined according to, for example, the SPI (Synchronous Peripheral Interface) communication protocol.

Figure 3A:
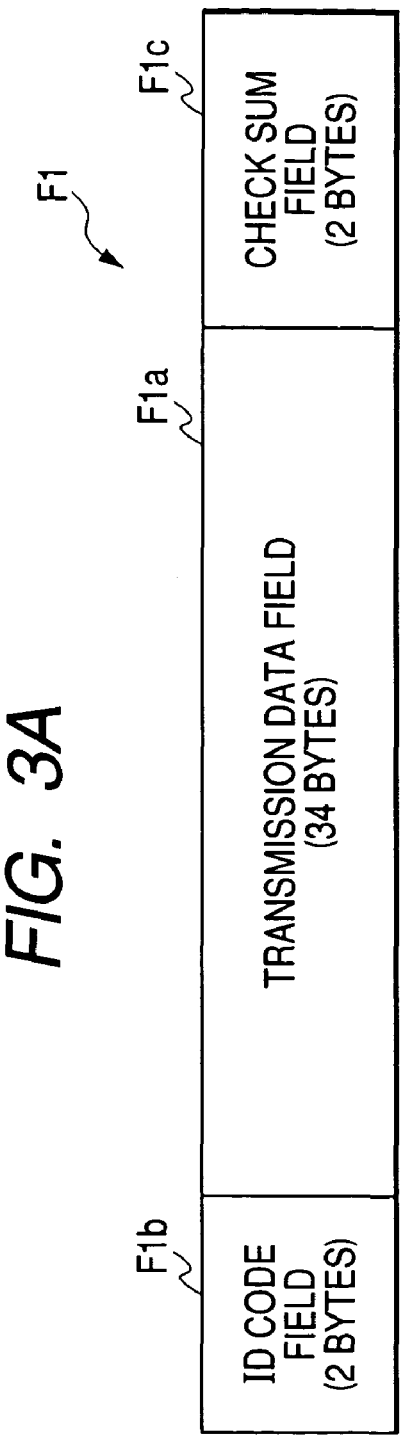
FIG. 3A is a schematic diagram illustrating a data structure of a packet according to the SPI communication protocol.

The CPU 10 is operative to produce each packet P1 based on each piece of the position control data according to the data format for the SPI communication protocol, as shown in FIG. 3A.

The CPU 10 is operative to send sequentially each packet P1 through the communication I/F 16 to the second microcomputer 2 according to the SPI communication protocol.

As shown in FIG. 3A, the data frame F1 of each packet is composed of a transmission data field F1*a*, an ID (identification) code field F1*b*, and a checksum field F1*c*.

That is, the CPU 10 sets a normal communication ID code with 2-bytes to the ID code field F1*b*. The normal communication ID code identifies the corresponding packet (data frame F1) as the position control data during the normal operation of the electronic control unit 3.

The CPU 10 also sets the 34-byte position control data to the transmission data field F1*a* as normal communication data, and a checksum code with 2 bytes to the checksum field F1*c*. The checksum code is calculated according to the 34-byte position control data for checking whether a communication error occurs in the 34-byte position control data.

Each of the above structured packets P1 is transmitted from the CPU 10 to the CPU 20 of the second microcomputer 2.

On the other hand, the WDT 17 is operative to monitor the operations of the second microcomputer 2. That is, the WDT 17 continuously monitors whether watchdog pulses WDP are periodically outputted through the communication line C1 from the second microcomputer 2 (CPU 20) to the CPU 10 of the first microcomputer 1.

If no WDPs are continuously inputted through the communication line C1 to the CPU 10 for a predetermined period, the CPU 10 then determines that any abnormalities have occurred in the second microcomputer 2, thereby transmitting a reset signal RS to the second microcomputer 2 through the communication line C2.

The CPU 10 of the first microcomputer 1 is also operative to transmit the reset signal to the second microcomputer 2 at the boot of the electronic control unit 3.

On the other hand, in the ROM 22 of the second microcomputer 2, default values corresponding to at least one type of the third calibration parameters and at least one type of the third learned parameters are previously stored. The at least one type of the third calibration parameters and at least one type of the third learned parameters are the minimal requirement for controlling the throttle valve position.

Figure 2B:
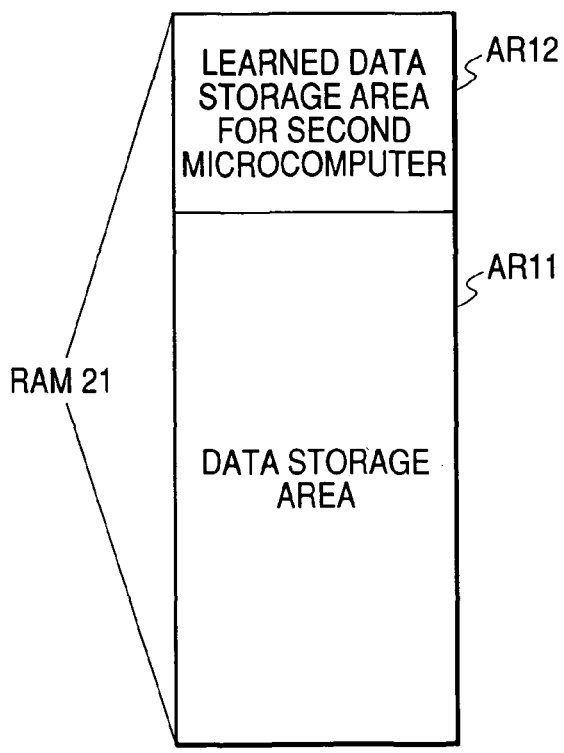
FIG. 2B is a schematic diagram illustrating the structure of storage areas of a memory unit of a second microcomputer illustrated in FIG. 1.

That is, the second microcomputer 2 receives the transmitted packets to store them in the data storage area AR11 and/or the learned data storage area AR12 of the RAM 21 (see FIG. 2B). The CPU 20 of the second microcomputer 2 controls through the valve actuator VA the valve position of the throttle valve 4 according to the position control data stored in the RAM 21.

That is, in the normal operation mode of the electronic control unit 3, the CPU 20 of the second microcomputer 2 uses the position control data stored in the RAM 21 in preference to the default values stored in the ROM 22 to perform the control of the throttle valve's position.

In addition, when the second microcomputer 2 normally operates, the second microcomputer 2 is operative to periodically transmit the watchdog pulses WDP through the communication line C1 and the communication I/F 24 to the CPU 10 of the first microcomputer 1.

Especially, according to the first embodiment, the communication line C3 is provided between the first microcomputer 1 and the second microcomputer 2 for transmitting a request to send the third calibration parameters and the third learned parameters, which are related to the control of the throttle valve's position, from the second microcomputer 2 to the first microcomputer 1. This communication line C3 is referred to as "initial communication line C3".

That is, the CPU 20 of the second microcomputer 2 constantly transmits an initial signal IS with a low level (for example, low voltage level) to the CPU 10 of the first microcomputer 1 through the initial communication line C3 during its normal operation.

When the CPU 20 of the second microcomputer 2 receives the reset signal RS from the CPU 10 of the first microcomputer 1 through the communication line C2, the CPU 20 transmits the initial signal IS with a high level (for example, high voltage level) to the CPU 10 through the initial communication line C3. The high level is higher than the low level.

The initial signal IS is configured to demand that the CPU 10 of the first microcomputer 1 transmits the third learned parameters and the third calibration parameters to the CPU 20 of the second microcomputer 20.

The CPU 10 of the first microcomputer 1, when receiving the initial signal IS through the initial communication line C3, transmits at least one of the third learned parameters and the third calibration parameters as the position control data to the CPU 20 of the second microcomputer 2.

When receiving the reset signal RS and the initial signal IS, the CPU 10 sends different control data according to the operation modes, such as the normal operation mode and the boot (startup) operation mode of the electronic control unit 3.

During the start-up process of the electronic system EC (electronic control unit 3) in the boot operation mode, when the CPU 20 of the second microcomputer 2 receives the reset signal RS from the CPU 10 of the first microcomputer 1 through the communication line C2, the CPU 20 outputs the initial signal IS through the initial communication line C3 to the CPU 10.

In this first embodiment, it is assumed that, when the ignition switch IG is turned on to start-up the engine to start the electronic control unit 3.

When the initial signal IS is transmitted through the initial communication line C3 from the CPU 20 to the CPU 10, the CPU 10 of the first microcomputer 1 reads out, in response to the initial signal IS, the third calibration parameters and the third learned parameters from the standby RAM 12, respectively. The third calibration parameters and the third learned parameters are important for the control of the throttle valve position of the throttle. The third calibration parameters and the third learned parameters are collectively referred to as "third control parameters" hereinafter.

The CPU 10 of the first microcomputer 1 divides the third control parameters every 34 bytes to produce a number of, for example, 14 packets P2 according to the data format for the SPI protocol, as shown in FIG. 3A to send sequentially the 14 packets to the second microcomputer 2 according to the SPI communication protocol.

Specifically, as shown in FIG. 3A, the CPU 10 sets an initial communication ID code with 2-bytes to the ID code field F1b of each packet P2. The initial communication ID code identifies the corresponding packet P2 as the third control parameters required for the control of the throttle valve position in response to the reset signal RS during the start-up process.

The CPU 10 also sets the 34-byte third control parameters to the transmission data field F1a of each packet as the position control data, and a checksum code with 2 bytes to the checksum field F1c. The checksum code is calculated according to the 34-byte third control parameters for checking whether a communication error occurs in the 34-byte third control parameters of each packet.

The 14 packets each having the above data format F1 are sequentially transmitted from the CPU 10 to the CPU 20 of the second microcomputer 2 through the communication line Cn.

Next, during the normal operation of the electronic control unit 3 in the normal operation mode, the CPU 20 of the second microcomputer 2 transmits the initial signal IS with the high level to the CPU 10 of the first microcomputer 1 through the initial communication line C3.

When receiving the high-level initial signal IS transmitted from the second microcomputer 2, the CPU 10 of the first microcomputer 1 reads out, in response to the high-level initial signal IS, only the third learned parameters from the standby RAM 12.

Figure 3B:
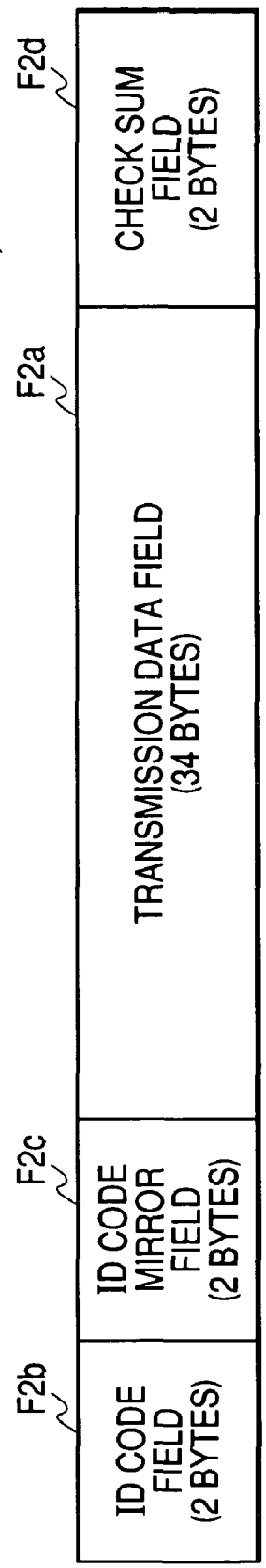
FIG. 3B is a schematic diagram illustrating a data structure of another packet according to the SPI communication protocol.

The CPU 10 produces one packet P3 that has 34 bytes based on the third learned parameters according to the data format for the SPI protocol, as shown in FIG. 3B. The CPU 10 sends the packet to the second microcomputer 2 according to the SPI communication protocol.

As shown in FIG. 3B, the data frame F2 of the packet P3 is composed of a transmission data field F2a, an ID code field F2b, an ID code mirror field F2c, and a checksum field F2d.

That is, the CPU 10 sets an abnormally communicated ID code with 2-bytes to the ID code field F2b and sets a mirror code that mirrors the abnormally communicated ID code to the ID code mirror field F2c of the packet. The abnormally communicated ID code identifies the corresponding packet P3 as the third learned parameters required for the control of the throttle valve position in response to the reset signal RS during the normal operation of the electronic control unit 3.

The CPU 10 also sets the 34-byte third learned parameters to the transmission data field F2a of the packet, and a checksum code with 2 bytes to the checksum field F2d. The checksum code is calculated according to the 34-byte third learned parameters for checking whether a communication error occurs in the 34-byte third learned parameters of the packet.

The packet having the above data format F2 is transmitted from the CPU 10 to the CPU 20 of the second microcomputer 2 through the communication line Cn.

In this first embodiment, after the second microcomputer 2 is reset due to any abnormalities in the normal operation mode, the one packet composed of the third learned parameters with 34 bytes is transmitted to the second microcomputer 2 from the first microcomputer 1.

These processes of the first embodiment are explained in relation to a case where the third learned parameters have smaller in data size than the third learned parameters so that one packet P3 having 34 bytes allows all of the third learned parameters to be transmitted.

One packet P3, however, may not include all third learned parameters.

In such a case, the CPU 10 of the first microcomputer 1 can extract at least one of the parameters in the third learned parameters, which has higher priority than other parameters therein, that is, which has more impact on the control of the throttle valve position than other parameters therein, thereby sending it to the second microcomputer 2.

In addition, the CPU 10 of the first microcomputer 1 may determine whether the high-level initial signal IS is still sent to the initial communication line C3 after a predetermined time has passed since the first microcomputer 1 sent the packet (position control data) to the second microcomputer 2. If the determination is YES, the CPU 10 may send again to the second microcomputer 2 the third learned parameters as the position control data for the control of the throttle valve position.

If the high-level initial signal IS is still sent to the initial communication line C3 after an additional predetermined time has passed since the first microcomputer 1 sent again the data as described above, the CPU 10 of the first microcomputer 1 may stop sending the position control data.

The CPU 20 of the second microcomputer 2 operates to control the throttle valve position of the throttle valve 4 according to the default values of the third learned parameters that are previously stored in the ROM 22 before the CPU 20 receives the position control data from the first microcomputer 1. The CPU 20 of the second microcomputer 2 also continues to control the throttle valve position according to the default values stored in the ROM 22 if the CPU 20 cannot receive, due to any causes, the third learned parameters from the first microcomputer 1.

FIG. 4 is a flowchart showing processes for detecting that any abnormalities occur in the second microcomputer 2, and FIG. 5 is a timing chart of the reset signal RS, the packet, and the initial signals IS.

In addition, FIG. 6A is a schematic diagram illustrating the structure of storage areas of the ROM 22 and the RAM 21, and FIG. 6B is a schematic diagram of storage areas of the RAM 21.

That is, in step 300, the WDT 17 of the first microcomputer 1 determines whether no WDPs are continuously transmitted from the second microcomputer 2 to the WDT 17 for the predetermined period.

If the WDT 17 determines that WDPs are continuously transmitted from the second microcomputer 2 through the communication line C1 to the WDT 17, that is, the determination is NO, the WDT 17 continues the determining process in step 300.

On the other hand, if the WDT 17 determines that no WDPs are continuously transmitted from the second microcomputer 2 through the communication line C1 to the WDT 17, that is, the determination is YES, the WDT 17 sends an error signal to the CPU 10. This error signal makes the CPU 10 recognize that an abnormality has occurred in the second microcomputer 2 in step 301.

Then, in step 302, the CPU 10 transmits, through the communication line C2, the reset signal RS to the second microcomputer 2 in response to the reception of the error signal.

As shown in FIG. 5, the CPU 20 of the second microprocessor 2 receives the reset signal RS at an arbitrary timing t1.

Then, the CPU 20, in response to the reception of the reset signal RS, loads the default value DV1 corresponding to the at least one type of third calibration parameters and stored in the ROM 22 on the data storage area AR11 of the RAM 11. Similarly, the CPU 20, in response to the reception of the reset signal RS, loads the default values DV2 corresponding to at least one type of the third learned parameters DV2 and stored in the ROM 22 on the data storage area AR12 of the RAM 12.

In addition, in response to the reception of the reset signal RS, the CPU 20 sends the initial signal IS with the high level through the initial communication line C3 to the first microcomputer 1.

Until receiving the packet P2 or P3 from the first microcomputer 1, the CPU 20 controls the throttle valve position according to the default values DV1 and DV2 stored in the RAM 21 (see FIG. 6A) and continues to send periodically the initial signal IS with high level to the first microcomputer 1 (see FIG. 5).

On the other hand, the CPU 10 of the first microcomputer 1 receives the initial signal IS with the high level. Then, the CPU 10 sends, in response to the reception of the high-level initial signal IS, the packet (the position control data) corresponding at least one of the third calibration parameters and the third learned parameters to the second microcomputer 2 at an arbitrary timing of t2 after the timing t1 (see FIG. 5).

When the CPU 20 receives the packet P2 or P3 transmitted form the first microcomputer 1 (see FIG. 5), the CPU 20 receives the packet P2 or P3. In response to the reception of the packet P2 or P3, the CPU 20 loads at least one type of the third calibration parameters on the data storage area AR11 of the RAM 21 and at least one type of the third learned parameters on the learned data storage area AR12 thereof, thereby updating position control data in the RAM 21 (see FIG. 6B).

Then, the CPU 20 controls the throttle valve position according to the updated third calibration parameters and third learned parameters stored in the RAM 21.

On the other hand, if the CPU 10 of the first microcomputer 1 receives the initial signal IS with the high level after the predetermined period has elapsed since the CPU 10 sends the packet P2 or P3 to the second microcomputer 1, then the CPU 10 resends the packet P2 or P3 to the second microcomputer 1.

After that, if the CPU 10 of the first microcomputer 1 receives the high-level initial signal IS after the predetermined period has elapsed since the CPU 10 resends the packet P2 or P3 to the second microcomputer 1, then the CPU 10 stops the resend of the packet P2 or P3 to the second microcomputer 1 to shift the normal communication data transmission operation described above.

Figure 7:
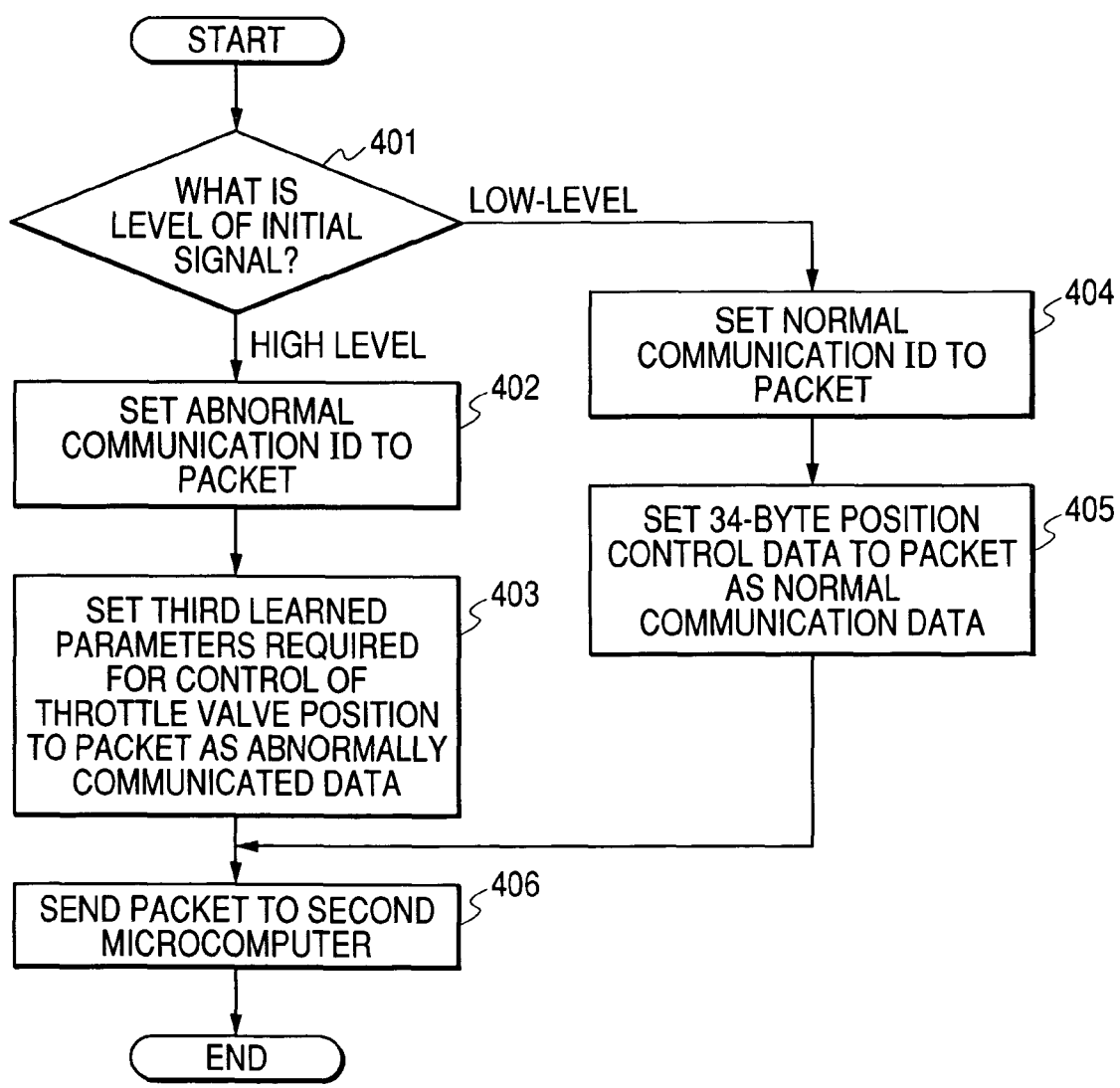
FIG. 7 is a flowchart illustrating processes of the first microcomputer and the second microcomputer shown in FIG. 1.

FIG. 7 is a flowchart showing processes for sending to the second microcomputer 2 at least one of the third calibration parameters and the third learned parameters that are required for the control of the throttle valve position during the normal operation of the electronic control unit 3. The CPU 10 performs these processes every 8 ms (milliseconds).

In step 401, the CPU 10 of the first microcomputer 1 receives the initial signal IS and determines whether the initial signal IS has the high level or the low level.

If the CPU 10 determines that the initial signal IS has the high level, the CPU 10 determines that the second microcomputer 2 requests to send the third learned parameters required for the control of the throttle valve position, and proceeds to step 402.

If the CPU 10 determines that the initial signal has the low level, then proceeding to step 404.

In step 402, the CPU 10 sets the abnormally communicated ID code to the ID code field F2b of the packet P3, and sets the mirror code to the ID code mirror field F2c of the packet P3. Setting of the abnormally communicated ID code and the mirror code to the packet P3 allows the CPU 20 of the second microcomputer 2 to identify whether the packet P3 received thereby is the position control data including the third learned parameters required for the control of the throttle valve position.

There is no need to provide an exclusive communication circuit or an exclusive communication line for sending the position control data describe above, thereby improving the utilization efficiency of the existing hardware of the electronic control unit 3.

In step 403, the CPU 10 reads out from the standby RAM 12 the third learned parameters required for the control of the throttle valve position and sets them as abnormally communicated data in the transmission data field F2a of the packet P3.

In step 403, the CPU 10 also sets the checksum to the checksum field F2d of the packet P3. Sending only the third learned parameters required for the control of the throttle valve position as the position control data to the second microcomputer 2 allows the time required for sending the third learned parameters and that required for the initial process by the second microcomputer 2 to be reduced.

On the other hand, if the CPU 10 determines that the initial signal IS has the low-level, the CPU 10 sets the normal communication ID to the ID code field F1b of each packet P1 in step 404.

In step 405, the CPU 10 sets the 34-byte position control data, which is composed of the 8-byte third calibration parameters, the 24-byte control data, and the 2-byte target position data, to the transmission data field F1a of each packet P1 as normal communication data. In step 405, the CPU 10 also sets the checksum to the checksum field F1c of each packet.

In step 406, the CPU 10 sends the packet P3 produced in steps 402-403 or each packet P1 produced in steps 404-405 to the second microcomputer 2, and ends the processes.

Incidentally, the first microcomputer 1 can determine whether the second microcomputer 2 is reset at the startup or under abnormal conditions, such as by determining whether the first microcomputer 1 itself is reset. That is, if the first microcomputer 1 is also reset, the first microcomputer 1 then determines that the second microcomputer 2 is reset at the startup, and if not, the first microcomputer 10 determines that the second microcomputer 2 is reset under abnormal conditions.

The second microcomputer 2 itself does not determine whether it is reset at the startup or under abnormal conditions, and performs the initial process when it is reset.

Figure 8:
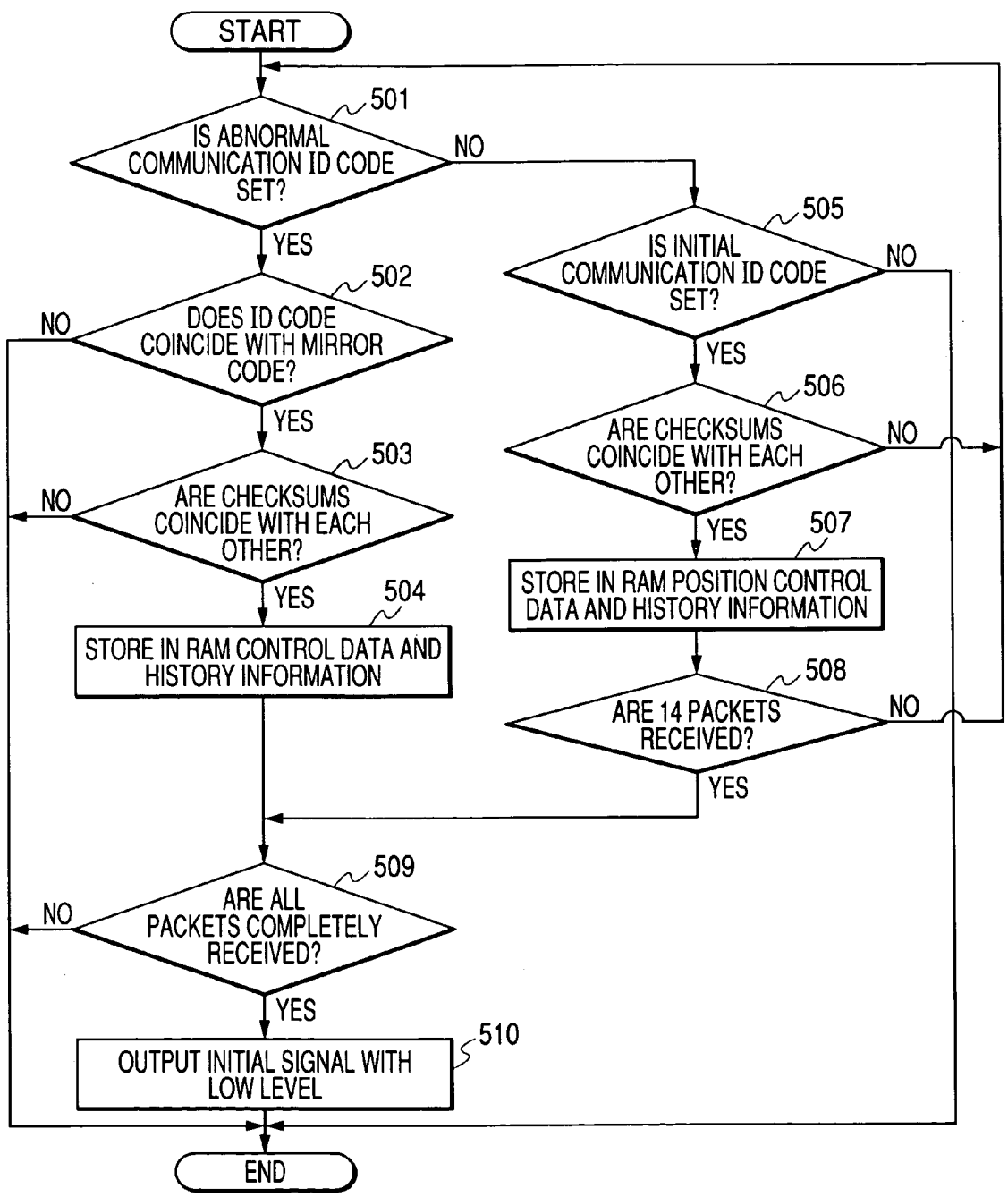
FIG. 8 is a flowchart illustrating processes of the first microcomputer shown in FIG. 1 according to the first embodiment.

FIG. 8 is a flowchart showing processes in which the CPU 20 of the second microcomputer 2 receives at least one of the third learned parameters and third calibration parameters that are required for the control of the throttle valve position and are outputted from the first microcomputer 1. The CPU 20 of the second microcomputer 2 performs these processes during its initial processes in which the CPU 20 outputs the initial signal IS with the high level through the initial communication line C3 to the first microcomputer 1.

In step 501, the CPU 20 of the second microcomputer 2 receives the packet and checks the ID code field (F1b, F2b) of the received packet to determine whether the abnormal communication ID code is set to the ID code field.

If the abnormal communication ID code is set to the ID code field, then it proceeds to step 502. If not, then it proceeds to step 505.

In step 502, the CPU 20 checks the ID code mirror field F2c of the packet to identify the mirror code set thereto, and determines whether the identified mirror code coincides with the abnormal communication ID code.

Determination of whether the abnormal communication ID code set to the ID code field F2b coincides with the mirror code set to the ID code mirror field F2c allows the CPU 20 to reliably determine whether it has received the abnormally communicated data (position control data representing the third learned parameters required for the control of the throttle valve position).

If the abnormal communication ID code set to the ID code field F2b coincides with the mirror code set to the ID code mirror field F2c, then it proceeds to step 503. If not, then it stops the processes.

In step 503, the CPU 20 calculates a checksum based on the abnormally communicated data (position control data) set to the transmission data field F2a and determines whether the calculated checksum coincides with the checksum set to the checksum field F2d of the packet.

If the determination in step 503 is YES, that is, the calculated checksum coincides with the previously set checksum to the checksum field F2d, then the CPU 20 proceeds to step 504. If not, then the processes end there.

In step 504, the CPU 20 stores the control data in the RAM 21. The control data represents the third learned parameters required for the control of the throttle valve position and is set as the abnormally communicated data to the transmission data field F2a of the packet. In step 504, the CPU 20 also stores in the RAM 21 history information representing that the third learned parameters are successfully received by the second microcomputer 2.

On the other hand, in step 505, the CPU 20 rechecks the ID code field of the packet and determines whether the initial communication ID code is set to the ID code field of the packet.

If the initial communication ID code is set to the ID code field of the packet, then the CPU 20 proceeds to step 506, and if not, then it ends the processes.

In step 506, the CPU 20 calculates a checksum based on the control data that includes the third learned parameters and third calibration parameters required for the control of the throttle valve position and is set to the transmission data field.

The CPU 20 determines whether the calculated checksum coincides with the checksum set to the checksum field of the packet.

If the determination in step 506 is YES, that is, the calculated checksum coincides with the previously set checksum to the checksum field, then the CPU 20 proceeds to step 507. If not, then the CPU 20 returns to step 501 and repeats the aforementioned processes.

In step 507, the CPU 20 stores the position control data in the RAM 21. The position control data represents the third learned parameters and the third calibration parameters required for the control of the throttle valve position and are set to the transmission data field F2a of the packet. In step 507, the CPU 20 also stores in the RAM 21 history information representing that the third learned parameters and the third calibration parameters are successfully received by the second microcomputer 2.

In step 508, the CPU 20 determines whether the 14 packets are received thereby. If the CPU 20 determines that the 14 packets are received, it then proceeds to step 509. If not, the CPU 20 then returns to step 501 and repeats the aforementioned processes.

In step 509, the CPU 20 determines, according to the history information stored in the RAM 21 produced in step 504 or in step 507, whether all the packets are correctly received by the CPU 20. If the CPU 20 determines that all the packets are correctly received thereby, then it shifts to step 510 and outputs the initial signal with the low level to the initial communication line C3, and then the processes end there.

If the CPU 20 determines that any one of the packets is not correctly received thereby, then it ends the processes.

Incidentally, if the second microcomputer 2 does not receive, due to some cause, the control data transmitted from the first microcomputer 1 that represents the third learned parameters and/or the third calibration parameters required for the control of the throttle valve position even if the second microcomputer 2 performs these processes as shown in FIG. 7.

In such a case, the CPU 20 of the second microcomputer 2 continues to control the throttle valve position according to the default values as shown in FIG. 6A.

As described above, the electronic control unit 3 of the first embodiment is provided with the initial communication line C3 between the first microcomputer 1 and the second microcomputer 2. The initial communication line C3 allows the second microcomputer 2 to transmit the initial signal IS to send the third learned parameters and/or the third calibration parameters required for the control of the throttle valve position.

If the initial signal IS with the high level is outputted through the initial communication line C3 during the operation of the electronic control unit 3, the first microcomputer 1 sends to the second microcomputer 2 the third learned parameters stored in the standby RAM 12 and required for the control of the throttle valve position.

As a result, it is possible to send to the second microcomputer 2, as the position control data, the third learned parameters required for the control of the throttle valve position without restarting the electronic control unit 3, even if the second microcomputer 2 is reset during the operation of the electronic control unit 3.

Second Embodiment

A second embodiment according to the present invention will now be described.

In the first embodiment, for example, the electronic system ES is installed in a vehicle to control a particular target, such as the engine, to be controlled in the vehicle. The first microcomputer 1 sends to the second microcomputer 2 both of calibration parameters and of learned parameters during the initial process at the startup of the electronic system EC. The calibration parameters represent the characteristic of at least one target to be controlled by the second microcomputer 2, such as the third calibration parameters, and the learned parameters represent the aging characteristic of the target, such as the third learned parameters.

In the electronic system ES of this second embodiment, the first microcomputer 1 sends to the second microcomputer 2 at least the calibration parameters required for the control of the target at the startup of the electronic system EC (electronic control unit 3).

In this second embodiment, the first microcomputer 1 also sends to the second microcomputer 2, as specified data, at least a part of the learned parameters and/or the calibration parameters described above, if, for example, any abnormalities to be reset occur in the second microcomputer 2 during the normal operation of the electronic system EC.

That is, the electronic system EC according to the second embodiment includes the following important features. The first microcomputer 1 stores the calibration parameters and the learned parameters that are required for the control of the target to be controlled by the second microcomputer 2. The first microcomputer 1 sends to the second microcomputer 2 the calibration parameters or the learned parameters as the control data at the startup of the electronic system EC.

The first microcomputer 1 also sends to the second microcomputer 2 as the specified data predetermined control data, that is, a part or all of the learned parameters and/or the calibration parameters, if, for example, any abnormalities to be reset occur in the second microcomputer 2.

Specifically, the specified data in the electronic system EC of this second embodiment does not necessarily include both of the calibration parameters and the learned parameters described above. When sending one of the calibration parameters and the learned parameters to the second microcomputer 2, it is not necessarily to send all pieces of one of the calibration parameters and the learned parameters.

The specified data that is sent at the startup of this electronic system EC may be of different types from or may have different data sizes from the specified data that is sent if, for example, any abnormalities to be reset occur in the second microcomputer 2 during the operation of the electronic system EC.

In other words, the data to be sent as the specified data may be selected according to the specifications of the electronic system EC from the calibration parameters and the learned parameters that are required for the control of the target.

In a preferred structure of this second embodiment, the electronic system EC is configured so that the calibration parameters are sent to the second microcomputer 2 as the control data at the startup of the electronic system EC. In addition, if, for example, any abnormalities to be reset occur in the second microcomputer 2, the calibration parameters are sent to the second microcomputer as the specified data.

In another preferable structure of this second embodiment, the electronic system EC is configured so that at least one predetermined parameter is extracted from all of the calibration parameters to be sent to the second microcomputer 2 as the specified data if the abnormalities occur in the second microcomputer 2. In this case, the learned parameters required for the control of the target to be controlled by the second microcomputer 2 are not sent to the second microcomputer 2, but the learned parameters are effectively used in the first microcomputer 1 for particular processes such as arithmetic operations.

More specifically, in the electronic system EC of this second embodiment, the third calibration parameters required for the control of the throttle valve position that are previously stored in the ROM 14 of the first microcomputer 1. At the startup of the electronic system EC, the third calibration parameters are sent to the second microcomputer 2 as the control data.

That is, in a similar manner as the first embodiment, 14 packets having 34 bytes per packet are sent to the second microcomputer 2 and stored in the RAM 21 thereof according to the procedures (steps) shown in FIG. 7.

If the initial signal IS with the high level is outputted through the initial communication line C3 due to any abnormalities during the normal operation of this electronic system EC to the first microcomputer 1, the first microcomputer 1 does not send to the second microcomputer 2 the third learned parameters, but sends thereto the third calibration parameters. Preferably, the first microcomputer 1 sends to the second microcomputer 2 at least one parameter selected from the third calibration parameters. The above features are mainly different from the structure of the electronic system EC according to the first embodiment.

Operation of each element constituting the electronic system EC of this second embodiment will be described in detail below.

When receiving the initial signal IS with the high level transmitted from the second microcomputer 2 during the normal operation of the electronic control unit 3, the CPU 10 of the first microcomputer 1 reads out selectively at least three types of third calibration parameters in all of the third calibration parameters stored in the ROM 14.

The CPU 10 sets the readout three types of third calibration parameters as the specified data. The CPU 10 then produces one packet according to the data format shown in FIG. 3B and sends it to the second microcomputer 2 according to the SPI communication protocol.

Specifically, the CPU 10 of the first microcomputer 1 sets an abnormally communicated ID code with 2-bytes to the ID code field F2b and also sets a mirror code that mirrors the abnormally communicated ID code to the ID code mirror field F2c of the packet. The abnormally communicated ID code identifies the corresponding packet as the three types of third calibration parameters required for the control of the throttle valve position.

The CPU 10 also sets the readout of the three types of third learned parameters to the transmission data field F2a of the packet as the specified data, and a checksum code with 2 bytes to the checksum field F2d. The checksum code is calculated according to the three types of third calibration parameters for checking whether a communication error has occurred in the three types of third calibration parameters.

The packet having the above data format F2 is transmitted from the CPU 10 to the CPU 20 of the second microcomputer 2 through the communication line Cn.

The three types of third calibration parameters, for example, include:
  [1] the conversion value between the valve position signal (voltage) outputted from the throttle position sensor 9 and the valve position of the throttle valve 4;
  [2] the gain value of the throttle valve 4 used by the feedback control of the engine; and
  [3] the abnormality determining value for determining the abnormal output of the throttle position sensor 9.

These three kinds of third calibration parameters are particularly important for the second microcomputer 2 to control the position of the throttle valve 4. That is, the CPU 10 of the first microcomputer 1 previously determines or selects the specified three types of third calibration parameters that are important or minimally required for the control of the position of the throttle valve 4 in all types of third calibration parameters.

When receiving the initial signal IS with the high level after the second microcomputer 2 is reset, the CPU 10 of the first microcomputer 1 sends the specified three types of third calibration parameters as the specified data to the second microcomputer 2. This allows the second microcomputer 2 to rapidly restart the control of the throttle valve position based on the transmitted specified data.

As the specified data, the three types of third calibration parameters are used as an example, but the three types of third calibration parameters are illustrated as an example to simplify the description of the specific data so that the specified data is not limited to the three types of third calibration data.

In particular, other types or more types of third calibration parameters may be used as the specified data. Each type of third calibration parameters may include one or more third calibration parameters. For simplicity of description about the specified data, it is supposed hereinafter that, as the specified data, the three types of third calibration parameters are used as an example.

In addition, during the start-up process of the electronic system EC (electronic control unit 3), when the initial signal IS with the high level is transmitted through the initial communication line C3 from the CPU 20 to the CPU 10, the CPU 10 reads out the third calibration parameters from the standby RAM 12, respectively. The third calibration parameters are important for the control of the throttle valve position.

The CPU 10 divides the third calibration parameters every 34 bytes to produce a number of, for example, 14 packets according to the data format for the SPI protocol, as shown in FIG. 3A to send sequentially the 14 packets to the second microcomputer 2 according to the SPI communication protocol.

Specifically, as shown in FIG. 3A, the CPU 10 sets an initial communication ID code with 2-bytes to the ID code field F1b of each packet. The initial communication ID code identifies the corresponding packet as the third calibration parameters.

The CPU 10 also sets the 34-byte third calibration parameters to the transmission data field F1a of each packet as the position control data, and a checksum code with 2 bytes to the checksum field F1c. The checksum code is calculated according to the 34-byte third calibration parameters for checking whether a communication error occurs in the 34-byte third calibration parameters according to the steps shown in FIG. 5.

The 14 packets each having the above data format F1 are sequentially transmitted from the CPU 10 to the CPU 20 of the second microcomputer 2 through the communication line Cn so that the packets are stored in the RAM 21 of the second microcomputer 2.

During the normal operation of the electronic system EC, the CPU 10 of the first microcomputer 1 sends to the second microcomputer 2 the packers each including 34-byte position control data composed of the 8-byte third calibration parameters, the 24-byte control data, and the 2-byte target position data.

Each time the CPU 20 sequentially receives each packet including the 34-byte position control data, the CPU 20 of the second microcomputer 2 writes the currently received third calibration parameters over the previously third calibration parameters stored in the RAM 21, thereby sequentially updating the third calibration parameters stored in the RAM 21. The third calibration parameters stored in the RAM 21, therefore, are kept identical with the third calibration parameters stored in the ROM 14 of the first microcomputer 1.

In the description below, it is assumed that the updating processes described above are carried out by the CPU 20.

The second microcomputer 2 according to the second embodiment controls the throttle valve position. The second microcomputer 2 also outputs, when receiving the reset signal RS from the first microcomputer 1 during the normal operation of the electronic control unit 3, the initial signal IS with the high level through the initial communication line C3 to the first microcomputer for requesting to send the abnormally communicated data.

In addition, the second microcomputer 2 writes in the RAM 21 the default values of the third learned parameters and third calibration parameters that are stored in the ROM 22.

That is, after transmitting the initial signal IS with the high level to the first microcomputer 1, the second microcomputer 2 receives the specified three types of third calibration parameters from the first microcomputer 1 as the abnormally communicated data. Then, the second microcomputer 2 writes the received three types off third calibration parameters over the corresponding default values stored in the RAM 21, respectively. The second microcomputer 2 thus uses the default values stored in the RAM 21 and the three types of third calibration parameters overwritten therein to restart the control of the throttle valve position.

The third calibration parameters required for the control of the throttle valve position that are stored in the ROM 14 of the first microcomputer 1 are optimally calculated according to the specifications and rating of the throttle valve 4. The default values stored in the ROM 22 of the second microcomputer 2 are commonly determined to control the throttle valve position.

The second microcomputer 2 can control the throttle valve position according to the third calibration parameters received from the first microcomputer 1 more adequately than according to the default values stored in the ROM 22 of the second microcomputer 2.

Other configurations and operations of the electronic control system EC according to the second embodiment are the same as those of the electronic control system EC according to the second embodiment.

Figure 9:
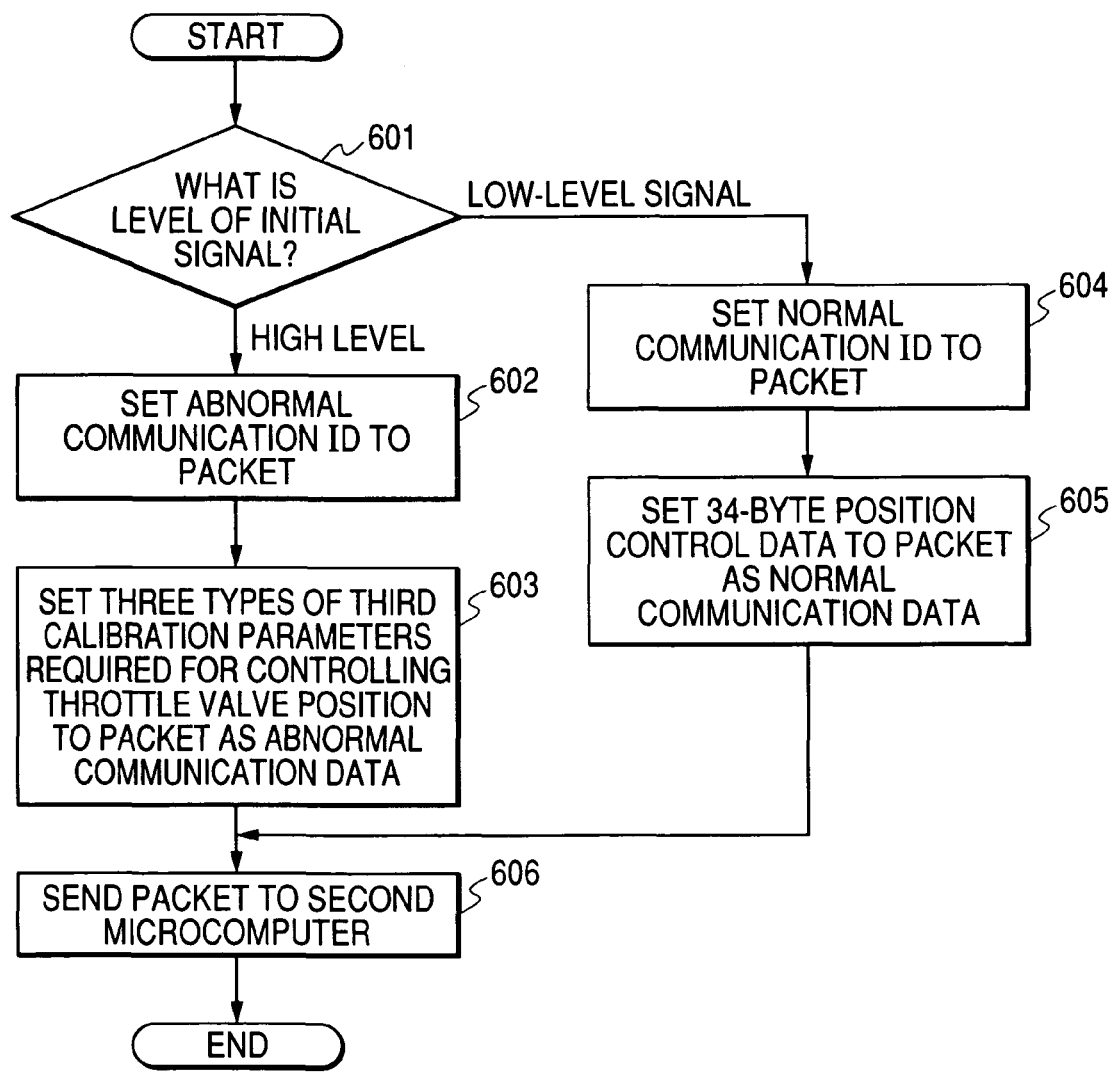
FIG. 9 is a flowchart illustrating processes of the second microcomputer shown in FIG. 1 according to the first embodiment.

FIG. 9 is a flowchart illustrating processes for sending to the second microcomputer 2 at least one of the third calibration parameters and the third learned parameters that are required for the control of the throttle valve position during the normal operation of the electronic control unit 3. The CPU 10 performs these processes every 8 ms.

In step 601, the CPU 10 of the first microcomputer 1 receives the initial signal IS and determines whether the initial signal IS has the high level or the low level.

If the CPU 10 determines that the initial signal IS has the high level, the CPU 10 determines that the second microcomputer 2 requests to send the three types of third calibration parameters required for the control of the throttle valve position, and proceeds to step 602. If the CPU 10 determines that the initial signal IS has the low level, then proceeds in step 604.

In step 602, the CPU 10 sets the abnormally communicated ID code to the ID code field F2b of the packet P3, and sets the mirror code to the ID code mirror field F2c of the packet P3. Setting of the abnormally communicated ID code and the mirror code to the packet allows the CPU 20 of the second microcomputer 2 to identify whether the packet received thereby is the position control data including the three types of third calibration parameters required for the control of the throttle valve position.

There is no need to provide an exclusive communication circuit or an exclusive communication line for sending the position control data describe above, thereby improving the utilization efficiency of the existing hardware of the electronic control unit 3.

In step 603, the CPU 10 reads out from the standby RAM 12 the specified three types of third calibration parameters as the specified data and sets them as abnormally communicated data in the transmission data field F2a of the packet P3. In step 603, the CPU 10 also sets the checksum in the checksum field F2d in the packet P3. Sending only the three types of third calibration parameters being sent as the control data allows the time required for sending the three types of third calibration parameters and that required for the initial process by the second microcomputer 2 to be reduced.

On the other hand, if the CPU 10 determines that the initial signal IS has the low-level, the CPU 10 sets the normal communication ID to the ID code field F1b of each packet P1 in step 604.

In step 605, the CPU 10 sets the 34-byte position control data, which is composed of the 8-byte third calibration parameters, the 24-byte control data, and the 2-byte target position data, to the transmission data field F1a of each packet P1 as normal communication data. In step 605, the CPU 10 also sets the checksum to the checksum field F1c of each packet P1.

In step 606, the CPU 10 sends the packet P3 produced in steps 602-603 or each packet P1 produced in steps 604-605 to the second microcomputer 2, and ends the processes.

Figure 10:
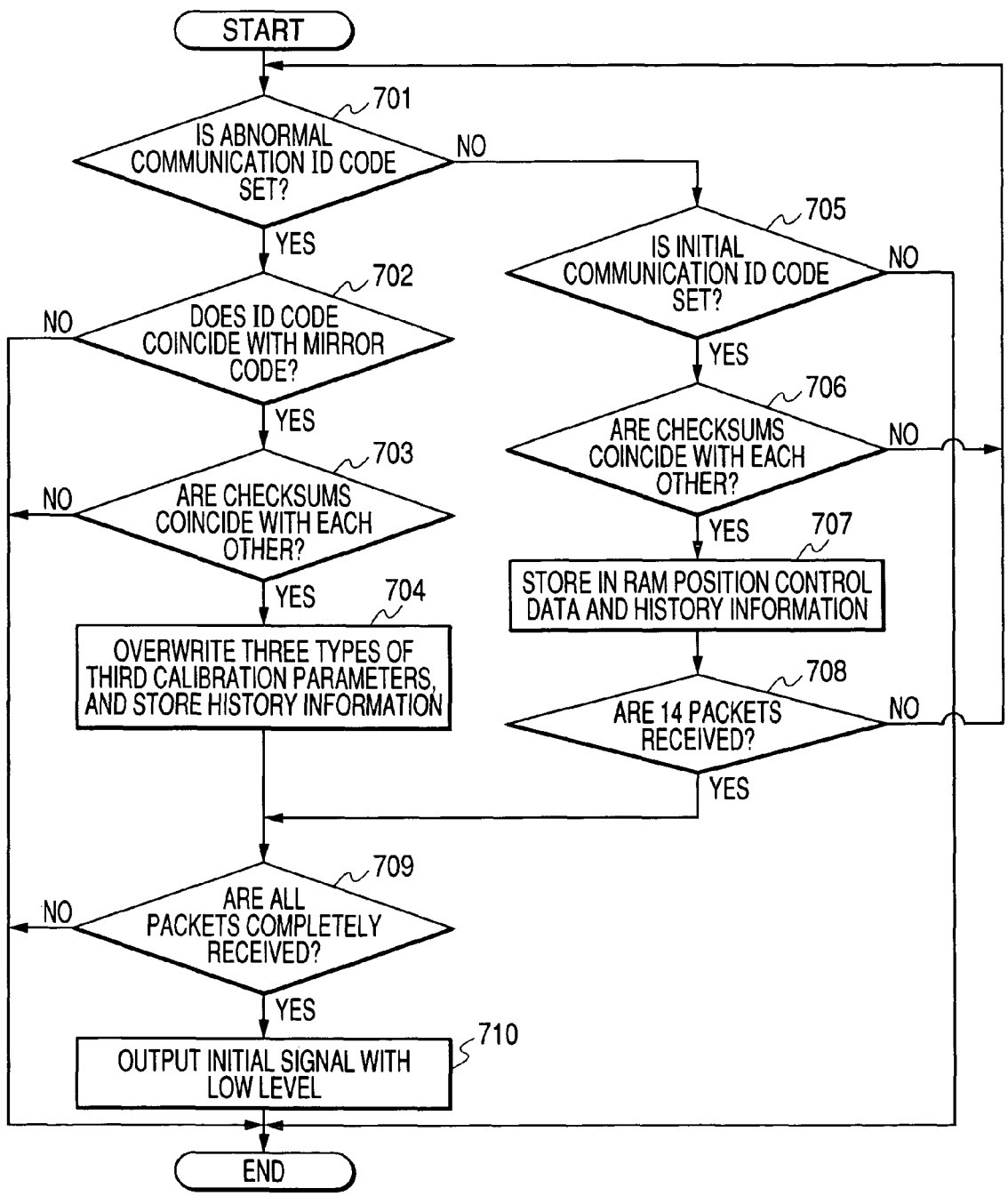
FIG. 10 is a flowchart illustrating processes of the first microcomputer shown in FIG. 1 according to a second embodiment.

FIG. 10 is a flowchart showing processes in which the CPU 20 of the second microcomputer 2 receives at least one of the third calibration parameters that are required for the control of the throttle valve position and are outputted from the first microcomputer 1. The CPU 20 of the second microcomputer 2 performs these processes during its initial processes in which the CPU 20 outputs the initial signal IS with the high level through the initial communication line C3 to the first microcomputer 1.

In step 701, the CPU 20 of the second microcomputer 2 checks the ID code field (F1b, F2b) of the packet received thereby and determines whether the abnormal communication ID code is set to the ID code field. If the abnormal communication ID code is set to the ID code field, then proceeds to step 702. If not, then it proceeds to step 705.

In step 702, the CPU 20 checks the ID code mirror field F2c of the packet to identify the mirror code set thereto, and determines whether the identified mirror code coincides with the abnormal communication ID code.

Determination of whether the abnormal communication ID code set to the ID code field F2b coincides with the mirror code set to the ID code mirror field F2c allows the CPU 20 to reliably determine whether it received the abnormally communicated data. The abnormally communicated data is the position control data representing the three types of third calibration parameters required for the control of the throttle valve position.

If the abnormal communication ID code set to the ID code field F2b coincides with the mirror code set to the ID code mirror field F2c, then proceeds to step 703. If not, then it stops the processes.

In step 703, the CPU 20 calculates a checksum based on the abnormally communicated data (position control data) set to the transmission data field F2a and determines whether the calculated checksum coincides with the checksum set to the checksum field F2d of the packet.

If the determination in step 703 is YES, that is, the calculated checksum coincides with the previously set checksum to the checksum field F2d, then the CPU 20 proceeds to step 704. If not, then the processes end.

In step 704, the CPU 20 writes in the RAM 21 the specified three types of third calibration parameters as the specified data over the corresponding default values whose types are the same as the three types of third calibration parameters. In step 704, the CPU 20 also stores in the RAM 21 history information representing that the specified three types of third calibration parameters have been successfully received by the second microcomputer 2.

On the other hand, in step 705, the CPU 20 rechecks the ID code field of the packet and determines whether the initial communication ID code is set to the ID code field of the packet.

If the initial communication ID code is set to the ID code field of the packet, then the CPU 20 proceeds to step 706, and if not, then ends the processes.

In step 706, the CPU 20 calculates a checksum based on the control data set to the transmission data field. The CPU 20 determines whether the calculated checksum coincides with the checksum set to the checksum field of the packet.

If the determination in step 706 is YES, that is, the calculated checksum coincides with the previously set checksum to the checksum field, then the CPU 20 proceeds to step 707. If not, then the CPU 20 returns to step 701 and repeats the aforementioned processes.

In step 707, the CPU 20 stores in the RAM 21 the position control data. The position control data represents the third calibration parameters required for the control of the throttle valve position. The position control data is set to the transmission data field F2a of the packet. In step 707, the CPU 20 also stores in the RAM 21 history information representing that the third calibration parameters and the third calibration parameters have been successfully received by the second microcomputer 2.

In step 708, the CPU 20 determines whether the 14 packets are received thereby. If the CPU 20 determines that the 14 packets are received, then it proceeds to step 709. If not, the CPU 20 then returns to step 701 and repeats the aforementioned processes.

In step 709, the CPU 20 determines, according to the history information stored in the RAM 21 produced in step 704 or in step 707, whether all the packets are correctly received by the CPU 20. If the CPU 20 determines that all the packets are correctly received thereby, then proceeds to step 710 and outputs the initial signal IS with the low level to the initial communication line C3, and then it stops the processes.

If the CPU 20 determines that any one of the packets are not correctly received thereby, then the processes end.

As described above, when the initial signal IS with the high level is outputted through the initial communication line C3 during the operation of the electronic control unit 3, the first microcomputer 1 sends to the second microcomputer 2 the specified three types of third learned parameters related to the control of the throttle valve position.

As a result, it is possible to send to the second microcomputer 2 the specified three types of third learned parameters required for the control of the throttle valve position without restarting the electronic control unit 3, even if the second microcomputer 2 is reset during the operation of the electronic control unit 3.

Third Embodiment

A third embodiment of the present invention will now be described.

In the first embodiment, the first microcomputer 1 sends to the second microcomputer 2 the calibration parameters during the normal operation of the electronic system EC. The calibration parameters represent the characteristic of at least one target to be controlled by the second microcomputer 2, such as the third calibration parameters.

In the electronic system ES of this third embodiment, the first microcomputer 1 sends to the second microcomputer 2 at least one of the calibration parameters and at least one of the learned parameters if, for example, any abnormalities to be reset occur in the second microcomputer 2 during the normal operation of the electronic system EC. At least one of the calibration parameters and at least one of the learned parameters are minimally required for the control of the target.

That is, the electronic system EC according to the third embodiment includes the following important features. The first microcomputer 1 stores the calibration parameters and the learned parameters that are required for the control of the target to be controlled by the second microcomputer 2. The first microcomputer 1 sends to the second microcomputer 2 the calibration parameters or the learned parameters as the control data at the startup of the electronic system EC.

The first microcomputer 1 also sends to the second microcomputer 2 at least one of the calibration parameters and at least one of the learned parameters that are minimally required for the control of the target if, for example, any abnormalities to be reset occur in the second microcomputer 2.

Operation of each element constituting the electronic system EC of this third embodiment will be described in detail below.

When the initial signal IS with the high level is transmitted from the second microcomputer 2 during the normal operation of the electronic control unit 3, the CPU 10 of the first microcomputer 1 receives the high-level initial signal IS. Subsequently, the CPU 10 reads out, in response to the high-level initial signal IS, at least one type of calibration parameters in all of the third calibration parameters and at least one type of learned parameters in all of the third learned parameters. At least one type of calibration parameters and at least one type of learned parameter are the minimal requirement for controlling the throttle valve position.

For example, one type of calibration parameters and two types of learned parameters are read out by the CPU 10 from the ROM 14.

The CPU 10 produces one packet based on the readout one type of calibration parameters and two types of learned parameters according to the data format F2 shown in FIG. 3B and sends it to the second microcomputer 2 according to the SPI communication protocol.

Specifically, the CPU 10 of the first microcomputer 1 sets an abnormally communicated ID code with 2-bytes to the ID code field F2b of the packet and also sets a mirror code that mirrors the abnormally communicated ID code to the ID code mirror field F2c of the packet. The abnormally communicated ID code identifies the corresponding packet as one type of the calibration parameters and two types of learned parameters.

The CPU 10 also sets the one type of third calibration parameters and the two types of third learned parameters to the transmission data field F2a of the packet as position control data, and a checksum code with 2 bytes to the checksum field F2d. The checksum code is calculated according to the one type of third calibration parameters and two types of third learned parameters for checking whether a communication error occurs in the one type of calibration parameters and the two types of learned parameters.

The packet having the above data format F2 is transmitted from the CPU 10 to the CPU 20 of the second microcomputer 2 through the communication line Cn.

The one type of third calibration parameters and the two types of third learned parameters include:

[1] the output voltage of the accelerator position sensor 8 when the accelerator pedal is located to the full-close position;

[2] the output voltage of the valve position sensor 9 when the throttle valve is located to the full-open position in the throttle; and

[3] the conversion value between the valve position signal (voltage) outputted from the throttle position sensor 9 and the valve position of the throttle valve 4;

These types of third calibration parameters and third learned parameters are especially important and minimally required for controlling the target, such as throttle valve 4 (engine part).

That is, the CPU 10 of the first microcomputer 1 previously specifies or selects the specified one type of third calibration parameters and two types of third learned parameters that are minimally required for the control of the position of the throttle valve 4 in all types of third calibration parameters and all types of learned parameters.

When receiving the high-level initial signal IS after the second microcomputer 2 is reset, the CPU 10 of the first microcomputer 1 sends the specified one type of third calibration parameters and two types of third learned parameters to the second microcomputer 2 as the position control data. This allows the second microcomputer 2 to rapidly restart the control of the throttle valve position based on the transmitted position control data.

As the position control data, one type of third calibration parameters and two types of third learned parameters are used as an example. However, the one type of third calibration parameters and the two types of third learned parameters are illustrated as an example of simplifying the description of the position control data so that the position control data is not limited to the one type of third calibration parameters and the two types of third learned parameters.

In particular, other types or more types of third calibration parameters and other types or more types of third learned parameters may be used as the position control data. Each type of third calibration parameters may include one or more third calibration parameters, and each type of third calibration parameters may include one or more third calibration parameters. For simplicity of description about the position control data, it is supposed hereinafter that, as the position control data, the one type of third calibration parameters and the two types of third learned parameters are used as an example.

The second microcomputer 2 according to the third embodiment controls the throttle valve position. The second microcomputer 2 also outputs, when receiving the reset signal RS from the first microcomputer 1 during the normal operation of the electronic control unit 3, the initial signal IS with the high level through the initial communication line C3 to the first microcomputer 1 for requesting to send the abnormally communicated data (position control data).

In addition, the second microcomputer 2 writes in the RAM 21 the default values of third learned parameters and third calibration parameters that are stored in the ROM 22. After transmitting the high-level initial signal IS to the first microcomputer 1, when receiving the one type of third calibration parameters and the two types of third learned parameters, the second microcomputer 2 writes the one type of third calibration parameters and the two types of third learned parameters over the corresponding default values stored in the RAM 21, respectively. The second microcomputer 2 thus uses the default values stored in the RAM 21 and the one type of third calibration parameters and the two types of third learned parameters overwritten therein to restart the control of the throttle valve position.

Other configurations and operations of the electronic control system EC according to the third embodiment are the same as those of the electronic control system EC according to the second embodiment.

Figure 11:
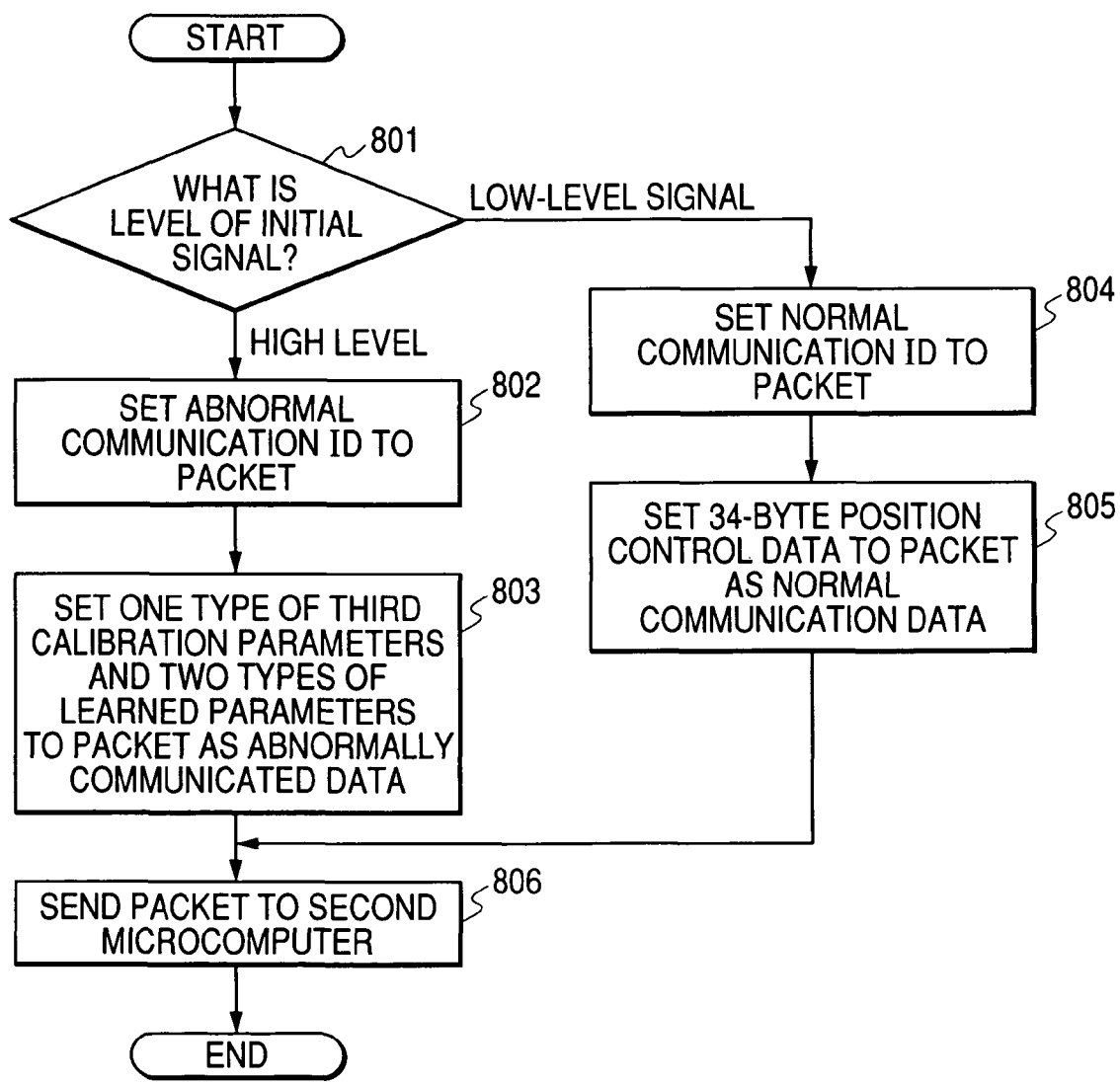
FIG. 11 is a flowchart illustrating processes of the second microcomputer shown in FIG. 1 according to the second embodiment.

FIG. 11 is a flowchart illustrating processes for sending to the second microcomputer 2 at least one of the third calibration parameters and the third learned parameters that are required for the control of the throttle valve position during the normal operation of the electronic control unit 3. The CPU 10 performs these processes every 8 ms.

In step 801, the CPU 10 of the first microcomputer 1 receives the initial signal IS and determines whether the initial signal IS has the high level or the low level.

If the CPU 10 determines that the initial signal IS has the high level, the CPU 10 determines that the second microcomputer 2 requests to send the minimum of the third calibration parameters and that of the third learned parameters required for the control of the throttle valve position, proceeding to step 802.

If the CPU 10 determines that the initial signal IS has the low level, then proceeding in step 804.

In step 802, the CPU 10 sets the abnormally communicated ID code to the ID code field F2b of the packet, and sets the mirror code to the ID code mirror field F2c of the packet P3.

Setting of the abnormally communicated ID code and the mirror code to the packet allows the CPU 20 of the second microcomputer 2 to identify whether the packet P3 received thereby is the position control data including the minimum of the third calibration parameters and that of the third learned parameters required for the control of the throttle valve position.

There is no need to provide an exclusive communication circuit or an exclusive communication line for sending the position control data described above, thereby improving the utilization efficiency of the existing hardware of the electronic control unit 3.

In step 803, the CPU 10 reads out from the standby RAM 12 the one type of the third calibration parameters and two types of third learned parameters, which correspond to the position control data. The CPU 10 sets them as abnormally communicated data to the transmission data field F2a of the packet P3.

In step 803, the CPU 10 also sets the checksum in the checksum field F2d in the packet P3. Sending the minimally required parameters for the control of the throttle valve position permits the time required for sending the minimally required parameters and that required for the initial process by the second microcomputer 2 to be reduced.

On the other hand, if the CPU 10 determines that the initial signal IS has the low level, the CPU 10 sets the normal communication ID to the ID code field F1*b* of each packet P1 in step 804.

In step 805, the CPU 10 sets the 34-byte position control data, which is composed of the 8-byte third calibration parameters, the 24-byte control data, and the 2-byte target position data, to the transmission data field F1*a* of each packet as normal communication data. In step 805, the CPU 10 also sets the checksum to the checksum field F1*c* of each packet P1.

In step 806, the CPU 10 sends the packet P3 produced in steps 802-803 or each packet P1 produced in steps 804-805 to the second microcomputer 2, and ends the processes.

Figure 12:
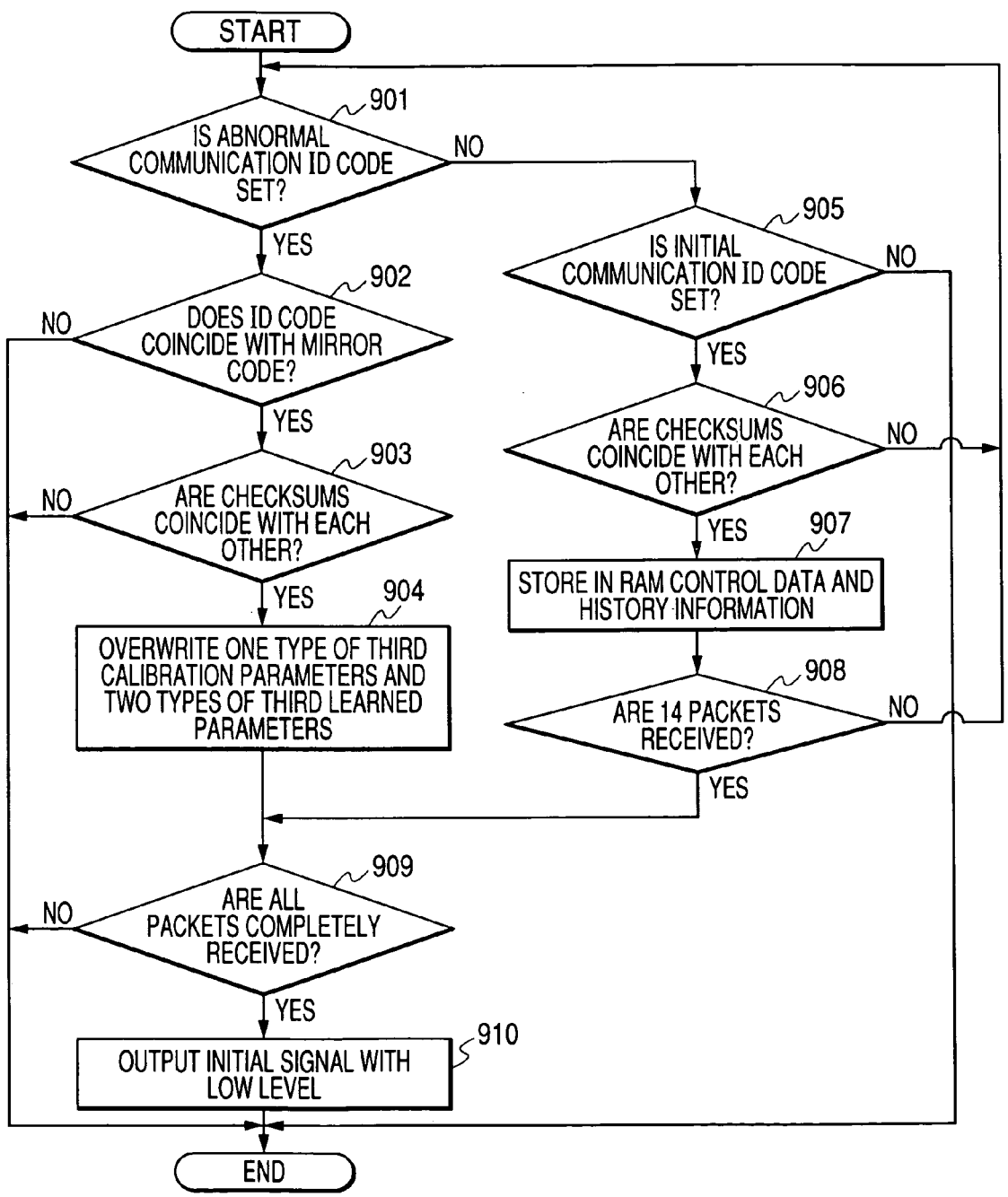
FIG. 12 is a flowchart illustrating processes of the first microcomputer shown in FIG. 1 according to a third embodiment.

FIG. 12 is a flowchart showing processes in which the CPU 20 of the second microcomputer 2 receives at least one of the third calibration parameters and the third learned parameters that are required for the control of the throttle valve position and are outputted from the first microcomputer 1. The CPU 20 of the second microcomputer 2 performs these processes during its initial processes in which the CPU 20 outputs the initial signal IS with the high level through the initial communication line C3 to the first microcomputer 1.

In step 901, the CPU 20 of the second microcomputer 2 checks the ID code field (F1*b*, F2*b*) of the packet transmitted from the first microcomputer 1 and determines whether the normal communication ID code is set to the ID code field. If the normal communication ID code is set to the ID code field, then proceeds to step 902. If not, then proceeds to step 905.

In step 902, the CPU 20 checks the ID code mirror field F2*c* of the packet to identify the mirror code set thereto, and determines whether the identified mirror code coincides with the normal communication ID code.

Determination of whether the normal communication ID code set to the ID code field F2*b* coincides with the mirror code set to the ID code mirror field F2*c* allows the CPU 20 to reliably determine whether it receives the abnormally communicated data. The abnormally communicated data is the position control data representing the three types of third calibration parameters required for the control of the throttle valve position.

If the normal communication ID code set to the ID code field F2*b* coincides with the mirror code set to the ID code mirror field F2*c*, then it proceeds to step 903. If not, then ends the processes.

In step 903, the CPU 20 calculates a checksum based on the abnormally communicated data (position control data) set to the transmission data field F2*a* and determines whether the calculated checksum coincides with the checksum set to the checksum field F2*d* of the packet.

If the determination in step 903 is YES, that is, the calculated checksum coincides with the previously set checksum to the checksum field F2*d*, then the CPU 20 proceeds to step 904. If not, then ends the processes.

In step 904, the CPU 20 writes in the RAM 21 the one type of third calibration parameters and the two types of third learned parameters over the corresponding default values whose types are the same as the one type of third calibration parameters and the two types of third learned parameters. In step 904, the CPU 20 also stores in the RAM 21 history information representing that the one type of third calibration parameters and two types of third learned parameters are successfully received by the second microcomputer 2.

On the other hand, in step 905, the CPU 20 rechecks the ID code field of the packet and determines whether the initial communication ID code is set to the ID code field of the packet.

If the initial communication ID code is set to the ID code field of the packet, then the CPU 20 proceeds to step 906, and if not, then ends the processes.

In step 906, the CPU 20 calculates a checksum based on the control data set to the transmission data field. The CPU 20 determines whether the calculated checksum coincides with the checksum set to the checksum field of the packet.

If the determination in step 906 is YES, that is, the calculated checksum coincides with the previously set checksum to the checksum field, then the CPU 20 proceeds to step 907. If not, then the CPU 20 returns to step 901 and repeats the aforementioned processes.

In step 907, the CPU 20 stores in the RAM 21 the position control data. The position control data represents the third calibration parameters and the third learned parameters required for the control of the throttle valve position. The position control data is set to the transmission data field F2*a* of the packet. In step 907, the CPU 20 also stores in the RAM 21 history information representing that the third calibration parameters and the third calibration parameters are successfully received by the second microcomputer 2.

In step 908, the CPU 20 determines whether the 14 packets are received thereby. If the CPU 20 determines that the 14 packets are received, then proceeds to step 909. If not, the CPU 20 then returns to step 701 and repeats the aforementioned processes.

In step 909, the CPU 20 determines, according to the history information stored in the RAM 21 produced in step 904 or in step 907, whether all the packets are correctly received by the CPU 20. If the CPU 20 determines that all the packets are correctly received thereby, then proceeds to step 910 and outputs the initial signal IS with the low-level signal to the initial communication line C3, and then ends the processes.

If the CPU 20 determines that any one of the packets is not correctly received thereby, then it stops the processes.

According to the third embodiment, if the initial signal IS with the high level is output to the initial communication line C3 during the operation of the electronic system ES, the first microcomputer 1 sends to the second microcomputer 2 the one type of third calibration parameters and two types of third learned parameters as the position control data. The one type of the third calibration parameters and two types of the third learned parameters are minimally required for the control of the throttle valve position.

As a result, it is possible to send to the second microcomputer 2 the minimally required parameters for the control of the throttle valve position without restarting the electronic control unit 3, even if the second microcomputer 2 is reset during the operation of the electronic control unit 3.

In the first embodiment, if the initial signal IS with the high level is output through the initial communication line C3 during the operation of the electronic control unit 3, the first microcomputer 1 sends to the second microcomputer 2 all of the third learned parameters as the position control data. The third learned parameters are required for the control of the throttle valve position and are stored in the standby RAM 12 in the first microcomputer 1. The present invention is not limited to the structure.

That is, the first microcomputer 1 may send only part of the third learned parameters stored in the standby RAM 12. This structure can further reduce the time required for sending the position control data and that required for the initial process of the second microcomputer 2.

In the second embodiment, if the initial signal IS with the high level is output to the initial communication line C3 during the operation of the electronic control unit 3, the first microcomputer 1 sends to the second microcomputer 2 the specified three types of third calibration parameters required for the control of the throttle valve position. The present invention, however, is not limited to the structure.

That is, the first microcomputer 1 may send all the third calibration parameters stored in the ROM 14 in the first microcomputer 1. This structure allows the second microcomputer 2 to control more adequately the throttle valve position after the initial process. The first microcomputer 1 may send part of the third calibration parameters as the position control data. This structure can further reduce the time required for sending the position control data and that required for the initial process of the second microcomputer 2.

In addition, the first microcomputer 1 may send the combination of the third learned parameters and third calibration parameters. This structure allows the second microcomputer 2 to control much more adequately the throttle valve position after the initial process.

In the third embodiment, if the initial signal IS with the high level is output to the initial communication line C3 during the operation of the electronic control unit 3, the first microcomputer 1 sends to the second microcomputer 2 the parameters minimally required for the control of the throttle valve position. The present invention, however, is not limited to the structure.

That is, the first microcomputer 1 may send to the second microcomputer 2 only the minimally required third learned parameters or minimally required third calibration parameters, as the position control data, for the control of the throttle valve position. This structure can further reduce the time required for sending the position control data and that required for the initial process of the second microcomputer 2.

In each of the first, second, and third embodiments, the first microcomputer 1 stores the third calibration parameters required for the control of the throttle valve position in the ROM 14 and sends them to the second microcomputer 2.

The first microcomputer 1, however, may store in the ROM 14 the third calibration parameters required for the control of various throttle valves that have different specifications and ratings, respectively. The first microcomputer identifies the throttle valve electrically connected to the electronic control unit 3 to select the third calibration parameters that correspond to the specifications and the rating of the identified throttle valve from all of the third calibration parameters of all of the throttle valves, thereby transmitting the selected third calibration parameters.

This structure allows the second microcomputer 2 to control the throttle valve position according to the transmitted third calibration parameters corresponding to the specifications and rating of the throttle valve connected to the electronic control unit 3. Even if the throttle valve is replaced, changing the third calibration parameters stored in the ROM 14 allows adequately controlling the throttle valve position without changing the second microcomputer 2 itself.

In each of the embodiments, the first microcomputer 1 and the second microcomputer 2 are installed in the common electronic control unit 3, which send and receive the third learned parameters and/or the third calibration parameters with each other.

However, the first microcomputer 1 and the second microcomputer 2 may be individually installed in separated electronic control units. In this structure, electrically connecting the separated electronic control units with each other through a communication line, such as an in-vehicle LAN laid inside of the vehicle, allows the first and second microcomputers to send and receive the third learned parameters and/or third calibration parameters.

In each of the first to third embodiments, the electronic system according to the present invention is installed in the control unit 3 for controlling the internal combustion engine for a vehicle.

The electronic system according to the present invention, however, may be suitably applied to any unit for controlling a plurality of devices, such as an air conditioner control unit.

In particular, the electronic system according to the present invention can be effectively applied to an apparatus having a plurality of control units, in which at least one of the control units has no memory for storing therein control data and learned data required to control a target of the at least one of the control units. The learned data represents the aging characteristic of the target.

The electronic system according to the present invention can also be effectively applied to another apparatus having a plurality of control units, in which the specified control unit collectively stores and controls the control data and the learned data related to each target of each control unit.

In addition, the structures of the electronic systems according to the first, second and third embodiments may be combined with each other within the scope of the invention.

While there has been described what is at present considered to be the embodiments and modifications of the invention, it will be understood that various modifications which are not described yet may be made therein, and it is intended to cover in the appended claims all such modifications as fall within the true spirit and scope of the invention.

This application is based upon and claims the benefit of priority of the prior Japanese Patent Application 2003-165546 filed on Jun. 10, 2003 and the prior Japanese Patent Application 2004-071319 filed on Mar. 12, 2004 so that the contents of which are incorporated herein by reference.

What is claimed is:

1. An electronic system having a first electronic unit for carrying out a first predetermined operation and a second electronic unit for carrying out a second predetermined operation, said first and second electronic units being electrically communicable with each other, said electronic system comprising:

a nonvolatile storage unit provided in the first electronic unit and configured to store therein control data, said second electronic unit requiring at least one of first and second pieces of the control data for carrying out the second predetermined operation on or after boot-up, the second electronic unit being configured to receive, on or after boot-up, at least one of the first and second pieces of the control data stored in the nonvolatile storage unit and sent from the first electronic unit; and request sending means provided in the second electronic unit for sending to the first electronic unit a request to send at least one of the first and second pieces of the control data when the second electronic unit is reset.

2. An electronic system according to claim 1, wherein said second electronic unit is electrically connected to a target device and controls an operation of the target device as the second predetermined operation, and said control data includes at least one of calibration data representing one or more operation characteristics of the target device, and learned data representing one or more aging characteristics of the target device, further comprising:

request receiving means provided in the first electronic unit for receiving the request; and control data sending means provided in the first electronic unit for sending to the second electronic unit the at least one of calibration data and the learned data.

3. An electronic system according to claim 2, wherein said control data is the calibration data.

4. An electronic system according to claim 2, wherein said calibration data includes a plurality of calibration parameters that represent the operation characteristics of the target device, respectively, said control data sending means is configured to extract at least one parameter from the plurality of calibration parameters to send the extracted at least one parameter to the second electronic unit.

5. An electronic system according to claim 2, wherein said control data sending means is configured to send packet data that is composed of the calibration data and identification data that allows the second electronic unit to identify the calibration data.

6. An electronic system according to claim 5, wherein said identification data includes a plurality of identification codes, further comprising packet data receiving means provided in the second electronic unit for receiving the packet data; and determining means provided in the second electronic unit for determining whether the received packet includes all of the plurality of identification codes, wherein said determining means determines to receive the calibration data only if the received packet includes all of the plurality of identification codes.

7. An electronic system according to claim 6, wherein said plurality of identification codes include a first code indicating the calibration data and a second code that mirrors the first code, and wherein said determining means determines to receive the calibration data only if the first code in the received packet coincides with the second code.

8. An electronic system according to claim 3, further comprising:
   default data storage means provided in the second electronic unit for storing therein default data for controlling the operation of the target device;
   control means provided in the second electronic unit for controlling the operation of the target device according to the default data if no calibration data is transmitted to the second electronic unit, and said control means controlling the operation of the target device according to the calibration data if the calibration data is transmitted to the second electronic unit.

9. An electronic system according to claim 2, wherein said control data is the learned data.

10. An electronic system according to claim 9, wherein said control data sending means is configured to send packet data that is composed of the learned data and an identification data that allows the second electronic unit to identify the calibration data.

11. An electronic system according to claim 10, wherein said identification data includes a plurality of identification codes, further comprising packet data receiving means provided in the second electronic unit for receiving the packet data; and determining means provided in the second electronic unit for determining whether the received packet includes all of the plurality of identification codes, wherein said determining means determines to receive the calibration data only if the received packet includes all of the plurality of identification codes.

12. An electronic system according to claim 11, wherein said plurality of identification codes include a first code indicating the learned data and a second code that mirrors the first code, and wherein said determining means determines to receive the learned data only if the first code in the received packet coincides with the second code.

13. An electronic system according to claim 9, further comprising:
   default data storage means provided in the second electronic unit for storing therein default data for controlling the operation of the target device;
   control means provided in the second electronic unit for controlling the operation of the target device according to the default data if no learned data is transmitted to the second electronic unit, and said control means controlling the operation of the target device if the learned data is transmitted to the second electronic unit.

14. An electronic system according to claim 2, wherein said control data includes both of the calibration data and the learned data.

15. An electronic system according to claim 2, further comprising:
   first reset signal sending means provided in the first electronic unit for sending a reset signal to the second electronic unit during a startup of the electronic system, said request sending means receiving the sent reset signal and sending to the first electronic unit the request in response to the reception of the reset signal;
   first request receiving means provided in the first electronic unit for receiving the request during the startup of the electronic system; and
   first control data sending means provided in the first electronic unit for sending to the second electronic unit the at least one of calibration data and the learned data.

16. An electronic system according to claim 15, further comprising:
   monitoring means provided in the first electronic unit for monitoring whether an abnormality occurs in the second electronic unit;
   second reset signal sending means provided in the first electronic unit and operatively connected to the monitoring mean, said second reset signal sending means sending a reset signal to the second electronic unit if the monitoring means determines that the abnormality occurs in the second electronic unit;
   second request receiving means provided in the first electronic unit for receiving the request during the occurrence of the abnormality in the second electronic unit; and
   second control data sending means provided in the first electronic unit for sending to the second electronic unit the at least one of calibration data and the learned data.

17. An electronic system having a first electronic unit for carrying out a first predetermined operation and a second electronic unit for carrying out a second predetermined operation, said first and second electronic units being electrically communicable with each other, said electronic system comprising:
   a nonvolatile storage unit provided in the first electronic unit and configured to store therein control data, said second electronic unit requiring pieces of the control data for carrying out the second predetermined operation on or after boot-up, the second electronic unit being configured to receive, on or after boot-up, the pieces of the control data stored in the nonvolatile storage unit and sent from the first electronic unit; and
   request sending means provided in the second electronic unit for sending to the first electronic unit a request to send a minimal piece of the pieces of control data when the second electronic unit is reset.

18. An electronic system according to claim 17, wherein said second electronic unit is electrically connected to a target device and controls an operation of the target device as the second predetermined operation, and said control data includes one of calibration data and learned data, the calibration data representing one or more operation characteristics of the target device, the learned data representing one or more aging characteristics of the target device, further comprising control data sending means provided in the first electronic unit and configured to extract pieces of one of the calibration data and the learned data to send the extracted pieces of one of the calibration data and the learned data to the second electronic unit, said pieces of one of the calibration data and the leaned data being minimally required for controlling the operation of the target device.

19. An electronic system according to claim 17, wherein said second electronic unit is electrically connected to a target device and controls an operation of the target device as the second predetermined operation, and said control data includes both of calibration data and learned data, the calibration data representing one or more operation characteristics of the target device, the learned data representing one or more aging characteristics of the target device, further comprising control data sending means provided in the first electronic unit and configured to extract one of the calibration data and the learned data to send the extracted pieces of one of the calibration data and the learned data to the second electronic unit, said pieces of one of the calibration data and the learned data being minimally required for controlling the operation of the target device.

20. An electronic system according to claim 17, wherein said second electronic unit is electrically connected to a target device and controls an operation of the target device as the second predetermined operation, and said control data includes the calibration data and learned data, the calibration data representing one or more operation characteristics of the target device, the learned data representing one or more aging characteristics of the target device, further comprising control data sending means provided in the first electronic unit and configured to extract pieces of one of the calibration data and the learned data to send the extracted pieces of one of the calibration data and the learned data to the second electronic unit, said pieces of one of the calibration data and the learned data being minimally required for controlling the operation of the target device.

21. A method of conducting communications in an electronic system having a first electronic unit for carrying out a first predetermined operation and a second electronic unit for carrying out a second predetermined operation, the first and second electronic units being electrically communicable with each other, the method comprising:
    storing control data in a nonvolatile storage unit provided in the first electronic unit, at least one of first and second pieces of the stored control data being required for the second electronic unit to carry out the second predetermined operation on or after boot-up;
    receiving, in the second electronic unit, on or after boot-up, at least one of the first and second pieces of the control data stored in the nonvolatile storage unit and sent from the first electronic unit; and
    sending, from the second electronic unit to the first electronic unit, a request to send at least one of the first and second pieces of the control data when the second electronic unit is reset.

22. A method according to claim 21, wherein the second electronic unit is electrically connected to a target device and controls an operation of the target device as the second predetermined operation, and said control data includes at least one of calibration data representing one or more operation characteristics of the target device, and learned data representing one or more aging characteristics of the target device, the method further comprising:
    receiving the request in the first electronic unit; and
    sending, from the first electronic unit to the second electronic unit, the at least one of calibration data and the learned data.

23. A method according to claim 22, wherein the control data is the calibration data.

24. A method according to claim 22, wherein the calibration data includes a plurality of calibration parameters that represent the operation characteristics of the target device, respectively, the first electronic unit extracts at least one parameter from the plurality of calibration parameters to send the extracted at least one parameter to the second electronic unit.

25. A method according to claim 22, wherein said first electronic unit sends packet data that is composed of the calibration data and identification data that allows the second electronic unit to identify the calibration data.

26. A method according to claim 25, wherein said identification data includes a plurality of identification codes, the second electronic unit receives packet data and determines whether the received packet includes all of the plurality of identification codes, and wherein the second electronic unit determines to receive the calibration data only if the received packet includes all of the plurality of identification codes.

27. A method according to claim 26, wherein said plurality of identification codes include a first code indicating the calibration data and a second code that mirrors the first code, and wherein second electronic unit determines to receive the calibration data only if the first code in the received packet coincides with the second code.

28. A method according to claim 23, further comprising:
    storing default data storage in the second electronic unit, the default data controlling the operation of the target device;
    controlling the operation of the target device by the second electronic unit according to the default data if no calibration data is transmitted to the second electronic unit, and the second electronic unit controlling the operation of the target device according to the calibration data if the calibration data is transmitted to the second electronic unit.

29. A method according to claim 22, wherein said control data is the learned data.

30. A method according to claim 29, wherein the first electronic unit is configured to send packet data that is composed of the learned data and an identification data that allows the second electronic unit to identify the calibration data.

31. A method according to claim 30, wherein said identification data includes a plurality of identification codes, the second electronic unit receives packet data and determines whether the received packet includes all of the plurality of identification codes, wherein the second electronic unit determines to receive the calibration data only if the received packet includes all of the plurality of identification codes.

32. A method according to claim 31, wherein said plurality of identification codes include a first code indicating the learned data and a second code that mirrors the first code, and wherein the second electronic unit determines to receive the learned data only if the first code in the received packet coincides with the second code.

33. A method according to claim 29, further comprising:

storing default data in the second electronic unit, the default data controlling the operation of the target device;

controlling the operation of the target device by the second electronic unit according to the default data if no learned data is transmitted to the second electronic unit, and said the second electronic unit controlling the operation of the target device if the learned data is transmitted to the second electronic unit.

34. A method according to claim 22, wherein said control data includes both of the calibration data and the learned data.

35. A method according to claim 22, further comprising:

sending a reset signal from the first electronic unit to the second electronic unit during a startup of the electronic system, said the second electronic unit receiving the sent reset signal and sending to the first electronic unit the request in response to the reception of the reset signal;

receiving, in the first electronic system, the request during the startup of the electronic system; and sending, from the first electronic unit to the second electronic unit the at least one of calibration data and the learned data.

36. A method according to claim 35, further comprising:

monitoring in the first electronic unit whether an abnormality occurs in the second electronic unit;

sending a second reset signal from the first electronic unit to the second electronic unit if the monitoring determines that the abnormality occurs in the second electronic unit;

receiving in the first electronic unit the request during the occurrence of the abnormality in the second electronic unit; and sending, from the first electronic unit to the second electronic unit, the at least one of calibration data and the learned data.

* * * * *